(12) United States Patent
Grant et al.

(10) Patent No.: US 9,888,130 B2
(45) Date of Patent: Feb. 6, 2018

(54) COMMUNICATIONS SYSTEMS AND METHODS USING WIRELINE ADAPTERS

(71) Applicant: UNIVERSCEL CORPORATION, San Clemente, CA (US)

(72) Inventors: David S. Grant, San Clemente, CA (US); Paul A. Higgs, Roswell, GA (US); Claus W. Knudsen, Allinge (DK); Brian P. Willnecker, Anaheim, CA (US); Rodney G. Hexter, Mission Viejo, CA (US)

(73) Assignee: UNIVERSCEL CORPORATION, San Clemente, CA (US)

( * ) Notice: Subject to any disclaimer, the term of this patent is extended or adjusted under 35 U.S.C. 154(b) by 0 days.

(21) Appl. No.: 14/635,180

(22) Filed: Mar. 2, 2015

(65) Prior Publication Data

US 2015/0244877 A1  Aug. 27, 2015

Related U.S. Application Data

(60) Continuation of application No. 13/557,021, filed on Jul. 24, 2012, now Pat. No. 8,971,524, which is a
(Continued)

(51) Int. Cl.
*H04M 3/00* (2006.01)
*H04M 5/00* (2006.01)
(Continued)

(52) U.S. Cl.
CPC .............. *H04M 19/08* (2013.01); *H04M 3/42* (2013.01); *H04M 11/007* (2013.01); *H04M 2207/206* (2013.01)

(58) Field of Classification Search
CPC ............ H04L 65/1069; H04L 61/1529; H04M 7/006; H04M 7/0075; H04M 1/2535
(Continued)

(56) References Cited

U.S. PATENT DOCUMENTS 4,114,142 A  9/1978  Wycoff et al.
4,984,267 A  1/1991  Martinez
(Continued)

FOREIGN PATENT DOCUMENTS

WO  WO 03/041369  5/2003

OTHER PUBLICATIONS

International Preliminary Report on Patentability and Written Opinion of the International Searching Authority received in International Application No. PCT/US2005/037065, 9 pages.
(Continued)

*Primary Examiner* — Alexander Jamal
(74) *Attorney, Agent, or Firm* — Haynes and Boone, LLP

(57) ABSTRACT

Systems and techniques for communication over telephony wireline. A command interface and control device may include a wireline input configured to connect the device to an operative line of a wireline telephony network (such as the PSTN) and to transmit voice signals to and receive voice signals from the wireline telephony network. The device may also include a cellular module configured to transmit signals to and receive signals from a cellular telephony network and a system controller to control communications on the wireline input and the cellular module. One or more wireline adapter modules may be configured to provide control functionality local to a telecommunications device.

20 Claims, 11 Drawing Sheets

Related U.S. Application Data division of application No. 12/210,833, filed on Sep. 15, 2008, now Pat. No. 8,229,103, which is a continuation of application No. 11/205,880, filed on Oct. 14, 2005, now Pat. No. 7,433,464.

(60) Provisional application No. 60/619,388, filed on Oct. 15, 2004.

(51) Int. Cl.
  *H04M 19/08* (2006.01)
  *H04M 3/42* (2006.01)
  *H04M 11/00* (2006.01)

(58) Field of Classification Search
  USPC .......................................... 379/413; 370/352
  See application file for complete search history.

(56) References Cited

U.S. PATENT DOCUMENTS

| | | |
|---|---|---|
| 5,267,305 A | 11/1993 | Prohs et al. |
| 5,274,579 A | 12/1993 | Nelson et al. |
| 5,487,066 A | 1/1996 | McNamara et al. |
| 6,137,189 A | 10/2000 | Youngblood |
| 6,212,226 B1 | 4/2001 | Newton |
| 6,295,217 B1 | 9/2001 | Yang et al. |
| 6,704,580 B1 | 3/2004 | Fintel |
| 7,408,923 B1* | 8/2008 | Khan ............... H04L 12/66 370/352 |
| 2004/0165573 A1 | 8/2004 | Kubler et al. |
| 2004/0165706 A1 | 8/2004 | Sarakas |
| 2004/0166895 A1 | 8/2004 | Koenck et al. |
| 2005/0025305 A1 | 2/2005 | Tischer et al. |
| 2005/0032435 A1 | 2/2005 | Tischer et al. |
| 2005/0041642 A1* | 2/2005 | Robinson ............ H04L 12/66 370/352 |
| 2005/0174992 A1 | 8/2005 | Files et al. |
| 2005/0176417 A1 | 8/2005 | Files et al. |
| 2006/0033809 A1 | 2/2006 | Farley |
| 2006/0114883 A1* | 6/2006 | Mehta ............... H04W 80/04 370/352 |

OTHER PUBLICATIONS

Kevin Banks, "Extend Your Knowledge of 64-Bit, The Goertzel Algorithm", Embedded Systems Programming, Aug. 28, 2002, 5 pages, Embedded.com. San Francisco, California, US.

* cited by examiner ns and techniques provided herein may be used to provide an integrated cell phone and wireline system, with inter-system communication using telephony wiring at the system location.

COMMUNICATIONS SYSTEMS AND METHODS USING WIRELINE ADAPTERS

CROSS REFERENCE TO RELATED APPLICATIONS

This application is a continuation of U.S. patent application Ser. No. 13/557,021 filed on Jul. 24, 2012, which is a divisional application of U.S. patent application Ser. No. 12/210,833 filed on Sep. 15, 2008, which is a continuation application of U.S. patent application Ser. No. 11/250,880 filed on Oct. 14, 2005, which claims priority to U.S. Provisional Application No. 60/619,388 filed on Oct. 15, 2004. The entire contents of such applications are hereby incorporated by reference.

BACKGROUND

1. Field of Invention

This invention generally relates to electronics and, more particularly to an integrated telecommunications system incorporating wireline technology and cell phone technology.

2. Related Art

Today's consumers are faced with a wide variety of electronic communications products and services, including home wireline telephone service, cell phone service, Internet telephone service, wireless networking services, and the like. Although there are a large number of available services, consumers may not be able to efficiently manage these various services to meet their communication needs. In the telecommunications arena, consumers may patch together a combination of wireline, cell phone, and Internet telephone communication services, with the result being redundant in some aspects and at the same time insufficient in other aspects.

With the overwhelming number of unsatisfactory options, consumers are frustrated. Rather than paying for redundant charges and services, a growing number of consumers are discontinuing conventional home wireline telephone service and opting for cellular telephone service alone. Cellular telephone service provides a number of attractive features not commonly found with home telephone systems: convenience, nobility, a single contact number, a single voicemail system, a single address book, and a single monthly bill.

However, this option may not be practical for many consumers. The quality of cell phone communications is generally significantly lower than the quality of wireline systems. Additionally, for households having multiple phone users, there is no integration among the different users. Finally, common cell phone fee structures may make a cell-only household more expensive than a combined wireline and cell phone household.

One approach to reducing the inefficiency and redundancy of today's telecommunication solutions is to find a way to adapt a cell phone to the wireline telephone system. However, there is a significant obstacle to such an approach. The public switched telephone network (PSTN) is monitored to determine whether any device is drawing current from or sourcing current to the network. If current draw or sourcing is detected, the telephone company may cut off service to the associated location.

Some existing solutions use inactive but pre-existing telephone wiring to provide a cell phone adapter, taking advantage of the fact that many homes have two sets of telephone wires but subscribe to a single line from their telephone service provider. However, these solutions are not optimal. First, some homes (such as older homes and apartments) have a single set of wires. Second, it is increasingly common for telephone company customers to subscribe to two lines; for example, in order to use one line as a voice line and the second as a dedicated fax line.

As a result, the existing cell and wireline telephone services are not optimal for many consumers.

SUMMARY

Systems and techniques provided herein may be used to provide an integrated cell phone and wireline system, with inter-system communication using telephony wiring at the system location.

In general, in one aspect, a device includes an input configured to transmit voice signals to and receive voice signals from a wireline telephony network and a power control module. The power control module may include a power supply in communication with the input and a power controller in communication with the power supply and the input. The power controller may be configured to detect a detected voltage on the input and to generate an error signal indicative of a difference between the detected voltage and a reference voltage. The power controller may be further configured to control the power supply based on the error signal.

The device may further include a system controller in communication with the power control module. The system controller is configured to transmit a signal indicative of a pending power event (such as a battery recharge event) to the power control module. The power control module may be configured to control the power supply based on the signal indicative of the pending power event.

The device may further include an analog to digital module in communication with the input, where the analog to digital module may be configured to convert an analog voice signal received in the input into data indicative of the analog voice signal. The device may further include a digital to analog module in communication with the input, where the digital to analog module may be configured to receive data and to generate a voice signal indicative of the data.

The device may further include a wireline adapter module in communication with a telecommunications device input. The wireline adapter module may include an analog to digital converter module, and may be configured to receive an analog signal from a telecommunications device in communication with the telecommunications device input and to convert the received analog signal into data.

The device may further include a cellular module in communication with an antenna, which may be a high gain antenna. The cell module may be configured to receive wireless telephony communications, which may include voice communications and telemetric data communications such as short messaging service (SMS) communications and multimedia messaging service (MMS) communications. The device may further include a system controller module in communication with the cell module, and the system controller module may be configured to receive telemetric data communications from the cell module, and may be configured to implement program instructions based on in the received telemetric data communications. The received telemetric data communications may include information indicative of one or more cellular phone service parameters and/or other parameters.

The power controller may include a voltage controlled oscillator in communication with the input, and the voltage controlled oscillator may be configured to oscillate at a detected frequency indicative of the detected voltage. The error signal indicative of the difference between the detected voltage and the reference voltage may comprise a difference between the detected frequency and a reference frequency indicative of the reference voltage. The power controller may be configured to determine a nominal voltage of the wireline telephony network at the device prior to transmitting voice signals to the wireline telephony network, and the reference voltage may be equal to the nominal voltage.

In general, in another aspect, a wireline adapter device may include a device input configured to receive a signal from an associated telecommunications device and a wireline input (such as a telephone jack) configured to connect the wireline adapter device to a controller module separate from the wireline adapter device over a connection comprising telephony wiring. The adapter device may include an analog to digital converter in communication with the device input and the wireline input. The analog to digital converter may be configured to receive the signal from the associated telecommunications device and to generate associated data. The adapter device may further include a digital to analog converter in communication with the device input and the wireline input. The digital to analog converter may be configured to receive data from the controller module and to convert the data to an analog signal.

The adapter device may further include a power management module, which may be configured to sense a low battery condition and to generate a signal indicative thereof. The adapter device may further include a command interface module configured to communicate with the controller. The analog to digital converter and the digital to analog converter are included in an internal controller unit, and wherein the internal controller unit further comprises a processor in communication with the analog to digital converter and the digital to analog converter.

In general, in another aspect, a telecommunications power controller includes an input configured to receive signals from a wireline telecommunications network and a power supply in communication with the input. The wireline telecommunications network may be a public switched telephone network.

The controller may further include a detection circuit in communication with the input, the power detection circuit configured to determine one or more parameters indicative of a voltage on the input. The detection circuit may comprise a voltage controlled oscillator. The controller may further include one or more low pass filters positioned between the input and the detection circuit.

The controller may further comprise a comparison circuit in communication with the detection circuit, the comparison circuit configured to compare the one or more parameters indicative of the voltage on the input to one or more associated parameters indicative of a reference voltage, and to generate one or more comparison parameters indicative of a difference therebetween. The controller may further include a control circuit in communication with the comparison circuit and the power supply, the control circuit configured to control the power supply based on the one or more comparison parameters.

In general, in another aspect, a device may include a wireline input configured to connect the device to an operative line of a wireline telephony network and to transmit voice signals to and receive voice signals from the wireline telephony network. The device may further include a cellular module configured to transmit signals to and receive signals from a cellular telephony network and a system controller in communication with the wireline input and the cellular module, the system controller configured to control communications on the wireline input and the cellular module.

The device may include an analog to digital converter configured to convert an analog signal from at least one of the wireline input and the cellular module to associated data, and may be configured to transmit the associated data to a first wireline adapter module separate from the device over the wireline input. The device may be configured to transmit the associated data to the first wireline adapter using time division multiplexing, frequency division multiplexing, or other transmission method.

The device may include a system controller is configured to control a first communication on the wireline input and a second communication on the cellular module, wherein the first communication and the second communication are both active during an overlap time.

The device may further include power control circuitry including a power supply in communication with the wireline input and a detection circuit in communication with the wireline input, where the power detection circuit may be configured to determine one or more parameters indicative of a voltage on the wireline input. The power control circuitry may further include a comparison circuit in communication with the detection circuit, where the comparison circuit may be configured to compare the one or more parameters indicative of the voltage on the wireline input to one or more associated parameters indicative of a reference voltage and to generate one or more comparison parameters indicative of a difference therebetween. The power control circuitry may further include a control circuit in communication with the comparison circuit and the power supply, which may be configured to control the power supply based on the one or more comparison parameters.

The device may further include an analog to digital converter configured to convert an analog signal from the wireline input to associated data, wherein the analog signal comprises a baseband signal component having a baseband frequency, and wherein the device is configured to transmit the associated data at a frequency different than the baseband frequency. The frequency may be greater than 1.5 MHz; for example, between about 6 MHz and 480 MHz.

The device may include a system controller comprising a machine-readable medium embodying information indicative of instructions that when performed by one or more machines result in operations comprising receiving information indicative of a dialed number for an outbound call from a wireline adapter module, processing the information indicative of the dialed number using at least one of a least cost routing algorithm and an automatic route selection algorithm, determining an outbound call route based on the processing; and routing the outbound call on the outbound call route. The outbound call route may be selected from a route accessed using the wireline input and a route accessed using the cellular module.

The cellular module may be configured to receive telemetric signals including at least one of data and instructions for the device. The system controller may be configured to control communications based on the at least one of data and instructions for the device. The device may include a universal serial bus, which may be a two wire universal serial bus. The device may include one or more interfaces, such as a universal serial bus interface.

In general, in another aspect, a method of command processing for a telecommunications system for communication with an external network may include initiating a communication between a device of the telecommunications system and an external device over the external network. The method may further include detecting a first tone generated by the device in response to a user selection and determining that the first tone is the first tone in at least one command sequence for the telecommunications system. The method may further comprise buffering the first tone as a buffered first tone. The method may further include detecting a second tone, determining if the second tone is the second tone in one or more of the at least one command sequences, and if the second tone is not the second tone in one or more of the at least one command sequences, transmitting the buffered first tone and the second tone on the external network.

The method may further include if the second tone completes one of the one or more of the at least one command sequences, executing the command in the telecommunications system. The method may further include if the second tone is the second tone in one or more of the at least one command sequences but does not complete one of the one or more of the at least one command sequences, buffering the second tone as a buffered second tone.

In general, in another aspect, an article comprising a machine-readable medium embodying information indicative of instructions that when performed by one or more machines result in operations comprising initiating a communication between a device of the telecommunications system and an external device over the external network. The operations may further comprise detecting a first tone generated by the device in response to a user selection and determining that the first tone is the first tone in at least one command sequence for the telecommunications system. The operations may further comprise buffering the first tone as a buffered first tone.

The operations may further comprise detecting a second tone and determining if the second tone is the second tone in one or more of the at least one command sequences, and if the second tone is not the second tone in one or more of the at least one command sequences, transmitting the buffered first tone and the second tone on the external network. The operations may further comprise, if the second tone completes one of the one or more of the at least one command sequences, executing the command in the telecommunications system, and if the second tone is the second tone in one or more of the at least one command sequences but does not complete one of the one or more of the at least one command sequences, buffering the second tone as a buffered second tone.

These and other features and advantages of the present invention will be more readily apparent from the detailed description of the exemplary implementations set forth below taken in conjunction with the accompanying drawings.

BRIEF DESCRIPTION OF THE DRAWINGS

Like reference symbols in the various drawings indicate like elements.

DETAILED DESCRIPTION

Figure 1:
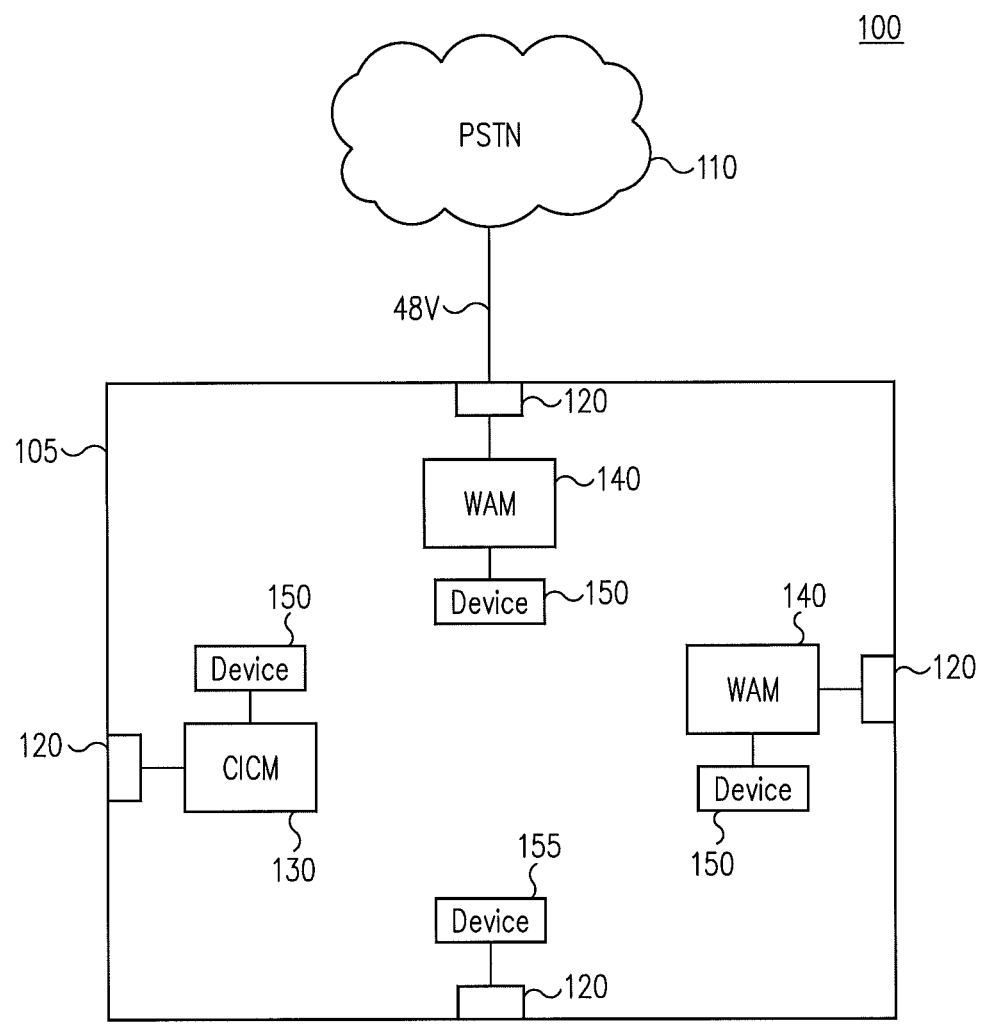
FIG. 1 is a system block diagram of a telecommunications system, according to some embodiments.

Systems and techniques provided herein may allow for seamless integration of wireline and cell phone services in a home, small business, or other location. The integration of both may allow for a system superior to the two separate systems.

Using the described systems and techniques, one or more PSTN lines (which may be referred to as telephone access points or TAPs), and one or more cellular lines (which may be referred to as phone over wireless lines or POWs) may be included in a single system communicating via a location's existing telephony wiring, but without substantially affecting portions of the PSTN located away from the location. Both the TAPs and POWs can be accessed by voice-based devices (e.g., telephones, answering machines, and the like) plugged into the system. Herein, the term "voice" includes sounds generated by a person, simulated voices such as those generated by interactive voice response (IVR) systems, as well as tones such as touch-tones generated by selecting buttons on a telephone. For example, the phrase "voice signal" includes signals generated by speaking into a handset of a telephone and tone signals generated by pressing telephone buttons.

The resulting integrated system may have a number of benefits. Multiple calls may be multiplexed on each line of existing telephony wiring at the location, rather than a single call per line. That is, both cellular and wireline telephone calls may be multiplexed on the location's existing telephony wiring, allowing for a larger number of usable lines per location. Although the system uses telephony wiring at the location that is in turn connected to a Central Office of the PSTN, the system does so in a way that does not substantially affect the Central Office.

Further, system control functionality brings features and functions of much more expensive PBX systems to the home or small business. For example, the system may implement smart call routing: calls may be routed to particular telephones on the system, based on pre-selected parameters. Some calls may be routed differently depending on the time, date, or other condition. Calls for a particular user may have one associated ring, while calls for a different user may have a different associated ring.

System control functionality may also enable users to enjoy the wide range of functions and features available in cellular telephone systems, at their home or business. For example, users can take advantage of cellular rate plans to make free-of-charge long distance telephone calls at certain times of the day or days of the week. Moreover, system control functionality also allows users to enjoy the benefits of wireline phone service, such as free-of-charge 800 number dialing, and enhanced E911 support.

An additional benefit is that system (fixed) cellular telephone technology may provide for greatly improved sound quality when compared to portable cellular phone technology. Improved quality is provided by two aspects of the system; first, the system control unit (which includes the cellular module) may be placed for optimum signal reception. Second, the cellular module may incorporate one or more signal improvement mechanisms, such as a high gain antenna and increased uplink/talk-back power when compared to portable cellular phones.

System functionality may be provided by a command interface and control module (CICM) and one or more wireline adapter modules (WAMs). The CICM may provide centralized control for the system, while each of the WAMs may provide local control of attached devices.

FIG. 1 shows a schematic diagram of a system 100, according to some embodiments. PSTN 110 is the public switched telephone network, which operates at a nominal voltage of about 48 V. For a location 105 (e.g., a house, apartment, business, or other location), PSTN 110 may be accessed at a plurality of inputs 120 (e.g., wall telephone jacks), that are connected in parallel to PSTN 110. In a common existing configuration, one or more devices 155 (telephone, modem, fax, answering machine, and the like) would be plugged directly into one or more of the telephone jacks and interface directly to the PSTN.

In embodiments of the current disclosure, devices 150 (telephones, answering machines, cell phone cradles, and other voice-based devices) are connected to PSTN 110 via WAM 140 and CICM 130. Other devices 155, such as devices not supported by a particular WAM 140 (e.g., fax machines, modems, and the like) may still connect directly to PSTN network 110 and operate in parallel with system 100. Note that in some embodiments, WAM 140 may be configured to support only voice-based devices, only data devices, or both.

In a conventional home telephone system, inputs 120 provide multiple device access to a single wireline telephone line. That is, although multiple devices may be plugged into different inputs 120, only a single communication line is open at one time. In order to provide integrated telecommunications services, system 100 may allow for multiple cell lines and an associated wireline to multiplex on the home telephone wiring, as described in further detail below.

System 100 may include at least one CICM 130 in communication with one or more inputs 120. CICM 130 may be configured to interface with PSTN network 110 and one or more cellular networks, and to provide one or more control functions for system 100. Particularly, CICM 130 may perform power monitoring and control for system 100, as well as frequency shifting to enable call multiplexing on existing telephony wiring. CICM 130 is described more fully below, with reference to FIGS. 2 and 5.

System 100 may further include one or more WAMs 140, internal and/or external to CICM 130, in communication with one or more inputs 120, one or more associated devices 150, and CICM 130. WAM 140 may implement local control and telephony functions for the associated device 150. For example, WAM 140 may provide ring-power and other functions to devices 150, may communicate with CICM 130, may provide filtering, may send touchtone signals, may provide a local ringing circuit, and may provide other functionality. An embodiment of WAM 140 is described in further detail below and with reference to FIG. 4.

In some embodiments, CICM 130 may implement WAM functionality, as described below, and no additional WAM modules need be used. As illustrated in FIG. 1, CICM 130 has WAM capability and device 150 may be directly connected to CICM 130 using an input module 235. System 100 may further include one or more devices 155 directly connected to an input 120 (i.e., not connected to a WAM 140).

Communication with CICM 130 may include sending and receiving digital and/or analog information to CICM 130 for processing. For example, CICM 130 may transmit ring pattern commands to connected WAM 140, and WAM 140 may provide the actual ring function in some implementations (with or without using an associated external power source, see below). Alternatively, in some implementations, WAM 140 may generate ringing voltage and frequency to permit device 150 to provide actual ringing function. In another example, WAM 140 may communicate touchtone sequence information to CICM 130 when placing a call, and CICM 130 may process the sequence information to determine if one or more features such as a Manual Bypass or Automatic Bypass feature may be activated.

There are a number of ways in which system 100 may be powered. For example, either CICM 130 or WAM 140 or both may be powered using AC power from a conventional electrical outlet. Alternatively, either one or both of CICM 130 and WAM 140 may be powered using a rechargeable battery.

For system 100, however, it may be inconvenient to plug in WAMs 140. For example, in some buildings inputs 120 may be located at some distance from electrical outlets. Therefore, according to some embodiments, CICM 130 is powered using AC power, while WAMs 140 are powered using rechargeable batteries. Power from CICM 130 is used to recharge WAMs 140 over the existing or new telephony wiring.

System 100 allows for a powered, integrated cell phone and wireline system using existing telephone wiring, but without exceeding allowable power variations. That is, any current sourced from or provided to PSTN 110 during battery charging of WAMs 140 is restored to acceptable levels within an acceptable period of time by CICM 130. In some embodiments, the power changes due to operation of system 100 are at a level about equal to or less than a typical noise level on an existing home telephone network.

Figure 2:
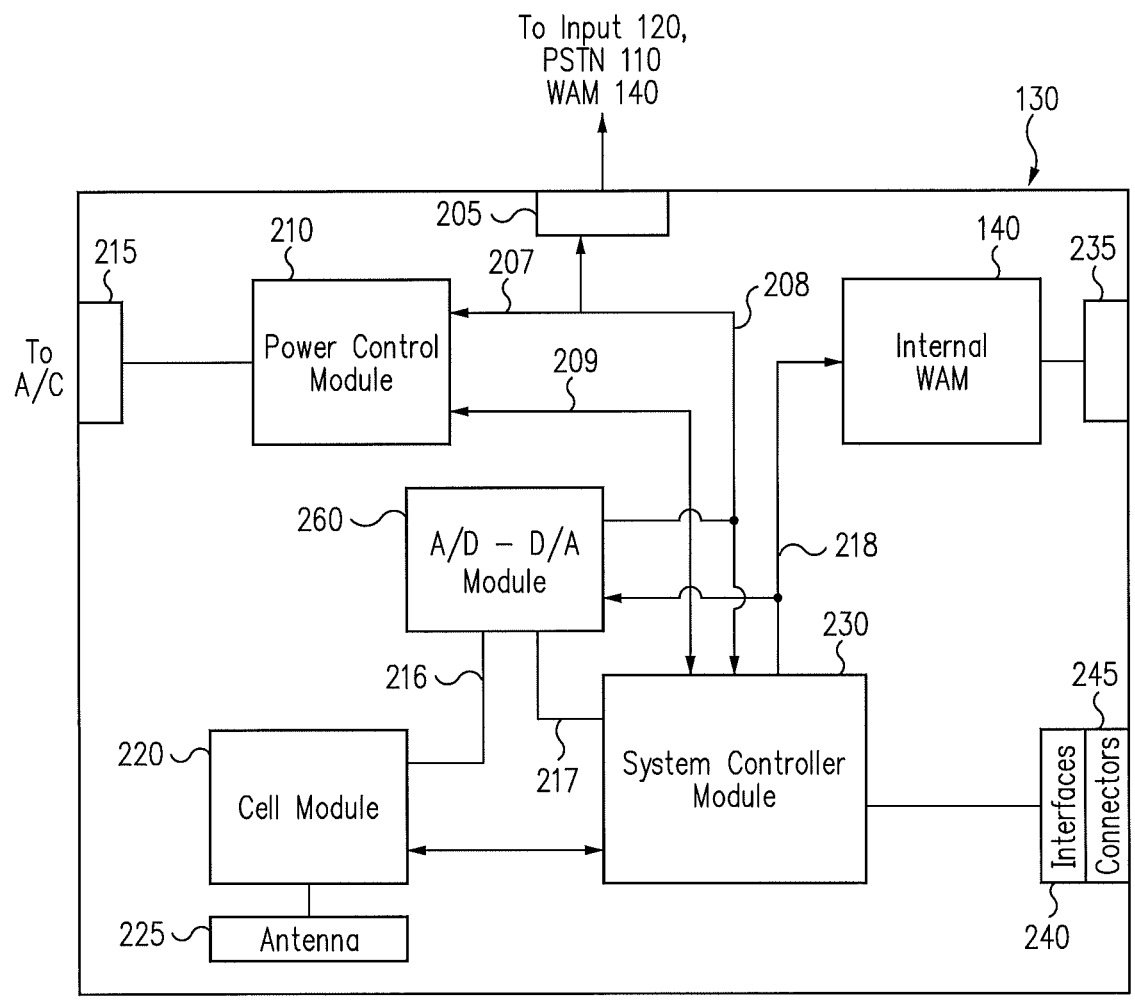
FIG. 2 is schematic diagram of a control module that may be used with a system such as that illustrated in FIG. 1, according to some embodiments.

FIG. 2 shows a schematic diagram of a CICM 130, according to some embodiments. Referring to FIGS. 1 and 2, CICM 130 includes an input module 205 to connect CICM 130 to PSTN 110 and one or more additional WAMs 140 (if desired) via an input 120, such as a standard telephone jack.

CICM 130 further includes a power inlet 215 to connect CICM 130 to AC (or other) power. For example, power inlet 215 may be used to plug CICM 130 into a standard (U.S. or other) wall outlet.

CICM 130 includes a power control module 210 to maintain the nominal voltage provided by PSTN 110, regardless of power usage in system 100. Power control module 210 is in communication with input module 205 via a single two-wire connection 207 for a one-line wireline system, or may be connected using more than one two-wire connection 207 for multi-line wireline systems. Upon installation of system 100 into a particular location, power control module 210 may implement one or more training algorithms to ascertain the nominal voltage level at that location (which may vary significantly among different locations).

CICM 130 further includes a system controller module 230 that may perform a number of controlling functions for system 100, using hardware and/or software. System controller 230 receives a telephone signal from input module 205 on a two-wire connection 208 in parallel with power control module 210. System controller 230 may provide information to power control module via an information channel 209.

CICM 130 may further include one or more cell modules 220 (e.g., GSM, CDMA, or other cell module) in communication with an antenna 225, which may be a high gain antenna. In operation, CICM 130 may receive and transmit voice and/or data signals over cell module 220, as explained in further detail below. Each cell module 220 may have an associated electronic serial number (ESN) or other electronic identifier. In some embodiments, at least one of the cell modules 220 may have a duplicate (shadow) ESN to a mobile cellular telephone. In such an embodiment, a call to the telephone number associated with the ESN may ring both the mobile cellular device and one or more the devices of the system including CICM 130.

CICM 130 may further include one or more internal WAMs 140 in communication with an input module 235. WAM 140 may be in communication with system controller 230 using a connector 218, and may provide an interface to an external device 150 via input module 235.

CICM 130 may further include one or more interfaces 240 with associated connectors 245. Interfaces 240 may include USB, 10/100 Base T, serial, and/or other interfaces. CICM 130 may include further modules that may be connected internally or via an expansion bus (not shown). For example, CICM 130 may include one or more WiFi modules to facilitate wireless data communication.

In some embodiments, CICM 130 may communicate with one or more devices external to system 100 using interface 240. For example, CICM 130 may communicate with a security system, heating system, cooling system, one or more appliances, and/or other device using an interface such as a wireless interface. As a result, system 100 may be used to monitor and/or control external devices for more efficient operation. Because CICM 130 may be commanded using over the air programming (described in more detail below), the devices may be controlled by entities other than the user. For example, a security service provider may provide program updates to a security system using CICM 130.

CICM 130 may be implemented as a self-contained modular device, designed to extend communication features and functionality. As noted above, CICM 130 may include one or more cell modules 220, allowing additional calling lines to be added to the location (e.g., home or office). This may provide a significant benefit for many users, particularly small office home office (SOHO) users.

For example, in order to integrate an office into a home telecommunications system, two or more additional phone lines may be needed: a business telephone line and a business fax line, for a total of three lines. As noted above, most homes have either one or two PSTN lines. In order to provide another line, the telephone company charges a significant amount of money (typically on the order of hundreds or thousands of dollars). Further, adding an additional PSTN line requires that additional wiring be provided, which requires disruptive installation in the home.

By contrast, the current systems and techniques provide a cost and time efficient method of adding one or more additional telephone lines. A user can subscribe to either one or two PSTN lines from a service provider, and can add one or more cell lines using CICM 130.

In order to efficiently use the additional lines made available by system 100, CICM 130 may enable multiplexing communications among different devices and on different lines using the telephony wiring. Communications may be multiplexed by converting analog voice signals to data, and transmitting the data at a frequency high enough that it does not cause interference with PSTN 110. Frequencies above the bands used for DSL (which extend to about 1.5 MHz), and which dissipate over relatively short distances on telephony wiring may be useful. In an exemplary embodiment, frequencies of about 12 MHz may be used.

CICM 130 may manage communications as follows. When a voice signal is received from cell module 220 and/or PSTN 110 for a device 150 associated with a WAM 140, CICM 130 converts the received voice signal to digital data indicative of the voice signal using an analog to digital (A/D) and digital to analog (D/A) module 260.

The digital data is then routed to the appropriate WAM 140, which converts the data to an analog signal to drive device 150. If a voice signal is generated at device 150, WAM 140 converts the voice signal to digital data and transmits it to CICM 130 for transmission over the appropriate line.

Module 260 may generate data packets for multiple ongoing communications, to enable call multiplexing. For example, a first call may be received over PSTN 110. System controller module 230 may determine routing information for the call based on one or more smart routing algorithms (described more fully below), or based on an activated device 150 associated with one or more of the WAMs 140 (e.g., all devices 150 may ring in response to the received call, but the call may be routed to only a first WAM 140 based on a single user picking up the handset of the associated device 150). System controller module 230 may provide routing information (e.g., an address for first WAM 140) to module 260 over control line 217 to route associated data packets.

A voice signal may then be received on input 205, converted to data packets at module 260, and transmitted to the first WAM 140 using the telephony wiring. The first WAM 140 receives the data packets, and converts the data to a voice signal to drive device 150.

During the call using the first WAM 140, a second call may be initiated using a second different WAM 140. If the second call is not a 911 call, system controller module 230 may determine that PSTN 110 is not available (for a single PSTN line 110) and route the second call through cell module 220. Voice signals generated at device 150 associated with second WAM 140 may be converted to digital data by second WAM 140 and transmitted to module 260 over the telephony wiring, to be converted to voice information to be transmitted on cell module 220. Voice signals received from cell module 220 are converted to data packets at module 260, and transmitted to the second WAM 140 via the telephony wiring. The second WAM 140 may convert the received data to a voice signal to drive the associated device 150.

Data packets may be routed to the appropriate WAM 140 using a number of different mechanisms. For example, data packets may be transmitted using TDM (time-division multiplexing). In a TDM system, each WAM 140 may have an assigned time slot for sending and receiving data packets.

In other embodiments, data packets may be transmitted using FDM (frequency division multiplexing). In a FDM system, each WAM 140 may have an assigned frequency band. Each of the WAMs 140 transmits data packets in its assigned frequency band and processes received data packets in the assigned frequency band, but does not process received data packets outside of the assigned frequency band.

Module 260 may also include identifier information as part of (for example) a packet header, so that the voice information is routed correctly in system 100. Module 260 may generate a packet header based on routing information received from system controller module 230 over control line 217.

Referring again to FIG. 1, some devices 155 may be directly connected to an input 120. Devices 155 may transmit voice and/or data signals on PSTN 110 without using a WAM 140 (and without converting the voice and/or data signals to associated digital data). During communications using devices 155, additional calls may be placed or received using one or more cell modules 220, or on a second PSTN line 110, as described above. The voice signals for the additional calls may be converted to digital data and communicated (e.g., via different frequency bands and/or multiplexing) on the telephony wiring with the signal for device 155.

Another benefit that may be provided by CICM 130 is the ability to customize system 100 for a particular environment or user, using one or more methods of programming CICM 130 and/or WAM 140. For example, cell modules 220 may enable over the air programming of CICM 130 and/or WAM 140, using SMS, MMS and/or other telemetric data transmission interface. Programming may also be accomplished via one or more interfaces 240, such as a USB, Ethernet, or other physical interface, or using DTMF (dual tone multi-frequency or touch-tone) signaling.

Different types of user interfaces may be used to enable a user to customize his or her telecommunications system. For example, a hosted web server/web site may also be used to provide an external, easy to use access point of service by which end users can initiate programming commands. The user may interact with one or more user interfaces presented by the web site to select one or more options for system 100. The web site may process the user input and, in response, may communicate one or more instructions to CICM 130 of system 100 to implement the selected functionality (e.g., via over-air programming utilizing SMS or MMS).

Rate plans and other mobile telephony information may be updated through over-the-air programming (or other method), in partnership with a selected cellular service provider. Over the air programming may allow for real-time updating of system parameters, without disturbing ongoing calls.

For embodiments in which external programming of WAMs 140 is not available, system 100 may enable WAMs 140 to be reprogrammed using CICM 130. The programming phase can be scheduled to a non-busy time by the system administrator by configuring CICM 130. If a user attempts to initiate a call using a WAM 140 that is undergoing a reprogramming process, a tone may be generated alerting the user that the desired device is unavailable at the current time.

As noted above, since CICM 130 and WAM 140 are in communication with PSTN 110 via internal telephony wiring, the system needs to comply with regulations requiring that power over PSTN 110 not be influenced or used. However, many advantages (such as those detailed in the current specification) may be obtained by providing a powered system using existing telephony wiring. Therefore, systems and techniques provided herein allow for power monitoring and control of system 100.

The negative 48 volts (−48 VDC) supplied by PSTN 110 is a non-ideal power source/supply. For example, it has built-in resistance due to line attenuations that cause unpredictable variances and fluctuations in the line voltage and current from home to home. Electrically, this results in voltage drops as users increase or decrease the load on the line (e.g., going "off-hook" or "on-hook, or adding more phones in the house). This may be unacceptable to some third party devices.

In order for WAMs 140 to operate at peak efficiency and maintain loads for long period of time, CICM 130 may be configured to measure and compensate for voltage fluctuations. When CICM 130 is in communication with PSTN 110 over an operational line, power control is implemented so that the requirements of FCC part 68.308 are satisfied.

Figure 3:
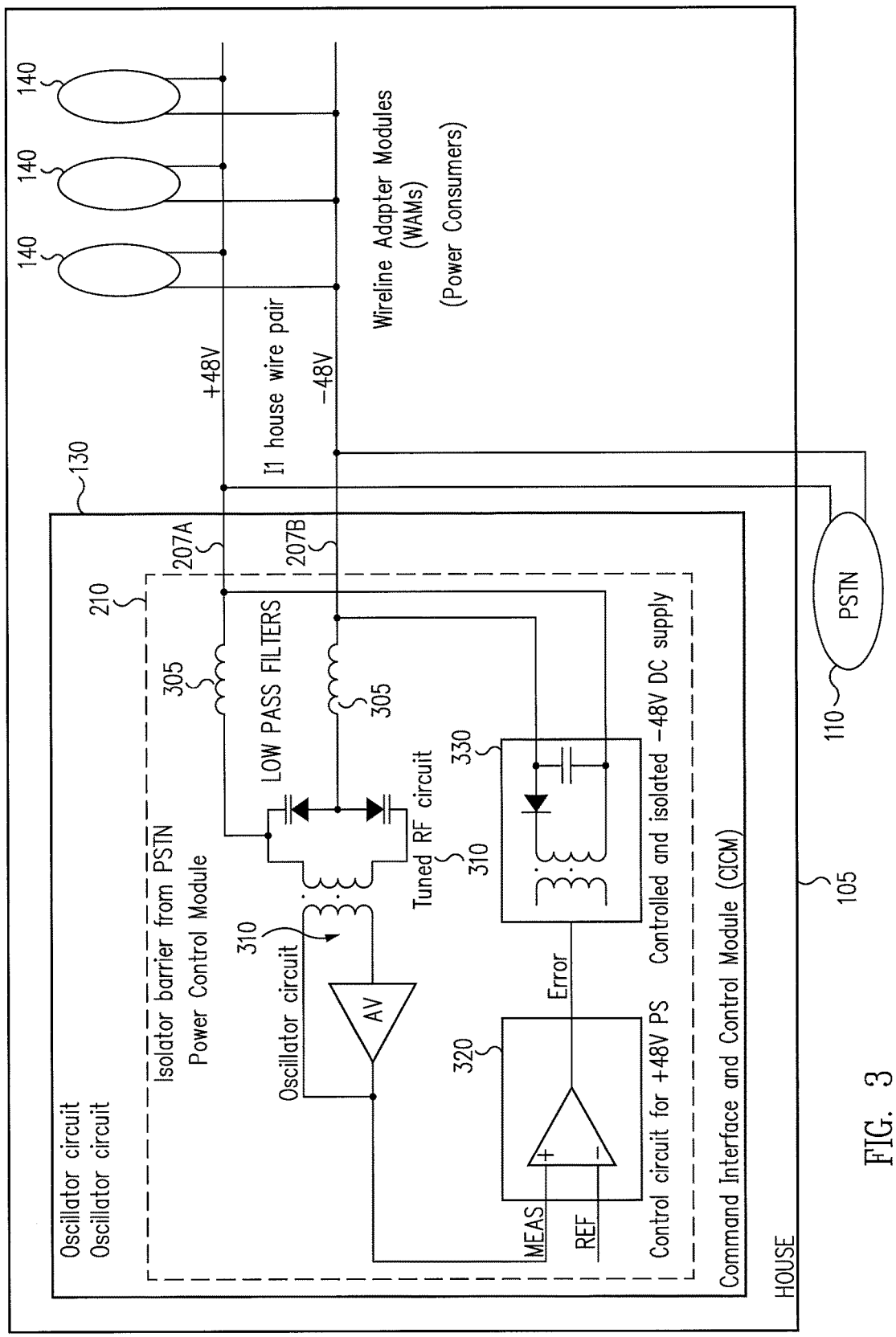
FIG. 3 is a diagram of a power control module that may be included in a control module such as that illustrated in FIG. 2, according to some embodiments.

FIG. 3 shows a power control module 210 included in a CICM 130 at a location 105, according to some embodiments. Power control module 210 is in communication with PSTN 110 via a two-wire connection 207, which includes a first connection 207A and a second connection 207B. Connections 207A and/or 207B may include one or more filters 305, which may be low pass filters.

Measurement of the DC voltage in the line is based on a tuned inductive/capacitive (LC) parallel circuit 310, where the capacitive component is based on a varactor array (a voltage/diode controlled capacitor). The tuned (resonant) circuit oscillates with a voltage-controlled frequency determined by the inductances and the varactor diodes. Comparison circuitry 320 determines an error amount between a measured frequency and a reference frequency, where the reference frequency is a frequency associated with the desired voltage. The error amount is used to increase or decrease the voltage of a nominally −48V DC power supply 330. As a result, the line voltage to and from PSTN 110 is substantially unaffected, while WAM 140 power is constant (and thus the batteries therein remain charged). Note that for optimal voltage regulation, sampling times should be sufficiently short.

In some embodiments, power control module 210 may be in communication with system controller module 230 of FIG. 2, and may receive a signal over information channel 209, where the signal is indicative of a pending recharge operation (or other power event). Because the electrical signature of a recharge may be known beforehand, power control module 210 may respond by increasing the voltage of power supply 330 by a pre-determined amount at a time coinciding with the scheduled beginning of the recharge operation. Similarly, power control module 210 may respond to an expected end of the recharge operation by decreasing the voltage of power supply 330 by a pre-determined amount at a time coinciding with the scheduled end of the recharge operation.

In some embodiments, power control module 210 may be configured to recognize particular power signatures and may not compensate for power changes associated with those power signatures. For example, power control module 210 may recognize a signature as being associated with an off-hook condition of a telephone. Because this type of power event is expected by the Central Office, power control module 210 may allow the power deviation to occur uncompensated.

As shown in FIG. 1, system 100 may include one or more WAMs 140, which may be separate from CICM 130, and/or may be integrated with CICM 130. WAMs 140 may implement features and functions local to one or more devices, and may communicate with CICM 130 over existing telephony wiring.

Figure 4:
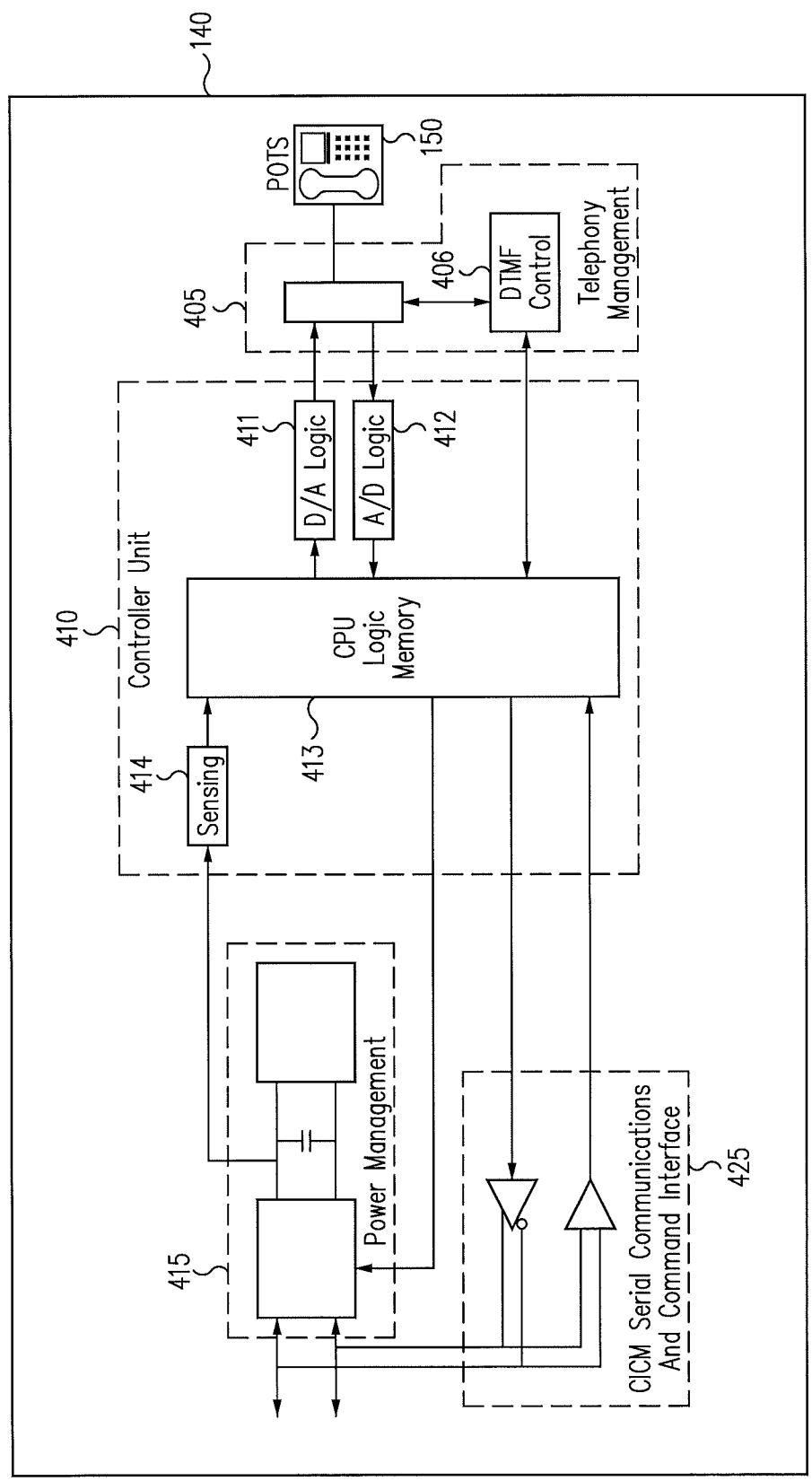
FIG. 4 is a schematic diagram of a wireline adapter module that may be used with a system such as that illustrated in FIG. 1, according to some embodiments.

FIG. 4 shows a schematic diagram of a WAM 140, according to some embodiments. WAM 140 sustains, signals, and controls devices 150, and is in communication with CICM 130 via the internal telephony wiring and/or over the air. Many different over-the-air protocols may be used; for example, Zigbee, Bluetooth, or other protocols. WAM 140 allows existing infrastructure (single or multiple pairs of twisted-pair, internal telephony wiring) to support multiple concurrent calls. Based on status and programming (e.g., over both physical and radio frequency control mechanisms), WAM 140 may be responsible for call direction, connection, and disconnection to other WAM and non-WAM connected devices.

In the illustrated embodiment, WAM 140 includes a telephony management module 405 in communication with a device 150. Telephony management module 405 is configured to provide tones, signals, and data conversions to facilitate simulation of central office (CO) functions to device 150 in incoming and outgoing call scenarios. Telephony management module may include a dual tone multi-frequency (DTMF) module 406.

WAM 140 further includes a controller unit 410 in communication with telephony management module 405. Controller unit 410 is configured to control and store data associated with call control and signaling, based on the status of connected devices. Controller unit 410 is also configured to communicate with CICM 130 in relation to call flow, routing, and interface switching.

Controller unit 410 may include a digital to analog module 411 and an analog to digital module 412 in communication with a processor 413. Digital to analog module 411 may receive data packets including voice information to be communicated via device 150. Module 411 may convert the data packets to an analog signal, which may then be used to drive device 150. Similarly, analog to digital module 412 may receive a voice signal to be transmitted via PSTN 110 or cell module 220 of FIG. 2, and may generate associated data packets.

Controller unit 410 may further include a sensing unit 414 in communication with a power management module 415. Sensing unit 414 may sense a low battery condition of power management module 415, and provide an indication of the low battery condition to processor 413.

Power management module 415 may be designed for low power, so that WAM 140 may operate without an external power supply or AC input (e.g., standard 110V/220V AC). In some embodiments, power management module 415 recharges an internal power supply using power provided by CICM 130.

An example of a recharge operation is as follows. Sensing unit 414 may sense a low battery condition of power management module 415, and provide an indication of the low battery condition to processor 413. WAM 140 may communicate the low battery condition to CICM 130 via interface 425 (using a wireless or wired signal connection to CICM 130). System controller 230 of CICM 130 may schedule a recharge operation and signal power control module 210 of CICM 130 of the pending recharge operation. CICM 130 may send timing information for the recharge operation to WAM 140. At the scheduled time, a recharge switch in WAM 140 may be closed so that a battery charger unit of power management module 415 is connected to a power supply included in power control module 210 (which may in turn be powered by an AC outlet), recharging the battery in the battery charger unit.

WAM 140 further includes a command interface module 425 in communication with processor 413 and power management module 415. Command interface module 425 provides a controlled interface and security to signals and process flow control between CICM 130 and WAM 140 central control functions. Additionally, module 425 may include one or more filters, to filter frequencies such as a baseband voice frequency (typically 300-3400 Hz), DSL frequencies (typically up to about 1.5 MHz), and/or other frequencies.

Signaling between CICM 130 and WAM 140 may be achieved using wired techniques, wireless techniques, or both. In some implementations, WAM 140 may be capable of receiving programming instructions from CICM 130 or other source, so that its operation is tailored to the particular telecommuting environment in which it operates. The uniquely programmable functions of WAM 140 offer not only ease of use, but also line-powered flexibility and integration with existing infrastructure.

As noted above, CICM 130 may include a system controller module 230, and WAM 140 may include a controller unit 410, power management module 415, and command interface 425 to implement many functions and features of system 100. Some functions and features of system 100 are outlined in further detail below. One important function that may be implemented is call multiplexing. In some embodiments, system controller module 230 and/or controller unit 410 may include software and/or hardware to allow multiple calls to be multiplexed on existing telephony wiring (that is, signals associated with multiple contemporaneous calls can be communicated among CICM 130 and WAMs 140 using the telephony wiring for the location, without substantially affecting the PSTN 110 away from the location).

Conventional PSTN communications use a 300 to 3400 Hz baseband frequency. System controller module 230 may receive voice communications over connector 208, and may convert the voice signal into digital data packets. System controller module 230 may transmit the digital data packets to one or more WAMs 140 over the existing telephony wiring, at a high frequency. WAM 140 may include similar packetizing circuitry to convert the voice signal back to baseband.

In other embodiments, calls may be multiplexed using methods other than by transmitting voice information on a high frequency carrier. However, transmitting data packets using a high frequency carrier may be particularly beneficial. For example, using a high carrier frequency ensures that PSTN 110 will not be disrupted, since high frequency signals dissipate in short distances on twisted pair.

Figure 5:
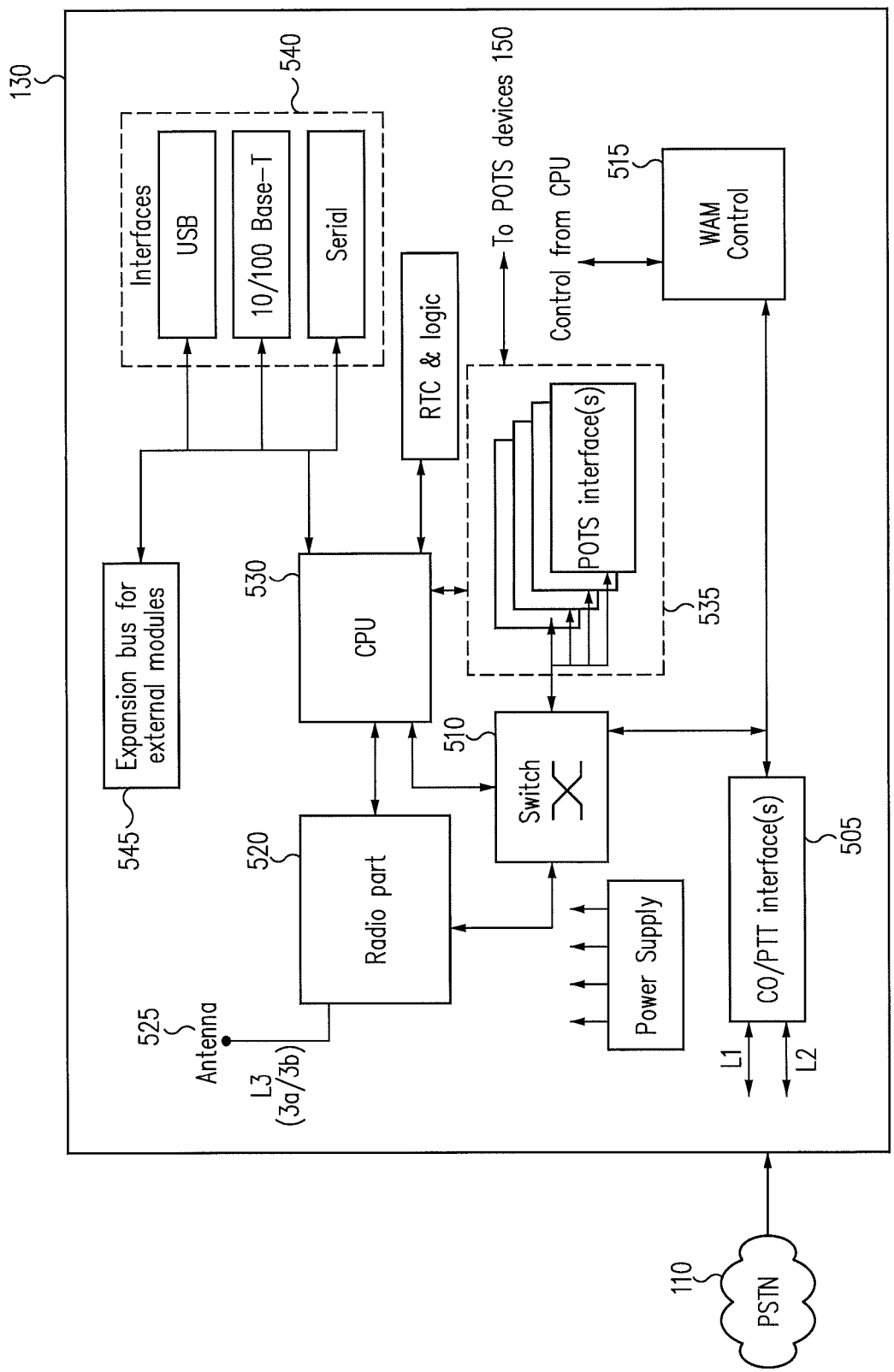
FIG. 5 is a schematic diagram of a control module that may be used with a system such as that illustrated in FIG. 1, according to some embodiments.

FIG. 5 shows a schematic of a CICM 130, according to some embodiments. CICM 130 includes one or more central office (CO)/POTS, telephone, telegraph (PTT) interface(s) 505 to interface with PSTN 110 or other wireline telephone system. Interface 505 may control signals and connections between a switch 510 and a processor 530 under direction of stored program information and/or in response to one or more signals from various connected media.

FIG. 5 illustrates a two-line system, where L1 and L2 are wireline connections to the wireline telephone system (e.g., two twisted pair connectors to PSTN 110). L1 and L2 may transmit voice signals from a class five Central Office using standard landline telephony tones, voltages, and signaling. L1 an L2 may be provisioned by the Central Office to provide Ring-in, Loop Start service with either BellCore FSK or DTMF ANI.

CICM 130 may further include a radio part 520 in communication with an antenna 525 to provide at least one cell phone line. For example, radio part 520 may prove a first cell line L3a and a second cell line L3b (which may be a virtual line). Calls may be received on L3a and L3b from a Mobile Telephony (e.g., Cellular/PCS) operator, and may be delivered to any standard mobile telephony interface service supported by and installed in CICM 130. Mobile telephony control logic and embedded air interfaces may be included, and may depend on the particular operator's recommendations at the time of deployment/rollout.

Parties may place and/or receive calls to/from the phone over wireless (POW) via L3a or L3b, or the telephone access port (TAP) via L1 and L2 (if both are present and connected). Although FIG. 5 illustrates an embodiment with a single POW physical connection, wireless services support call waiting; hence, a second calling party. The TAP can support two landline connections, for up to two phone numbers. Since each phone number can support call waiting, a maximum of four parties may be active on calls to the TAP.

Cellular reception may be improved by implementing one or more signal amplifiers, one or more signal repeaters, and/or a high gain antenna. For example, radio part 520 may provide for improved cellular coverage at the location of CICM 130, by utilizing a high-gain antenna 525. Use of high gain antenna 525 may enable lower noise figure gain for better reception and transmission of in-band, wireless signals, as well as a lower power demand than amplified systems. Further, high gain antenna 525 may be used with both cellular bands (A/B, 824-849 MHz mobile TX, and 869-894 mobile RX), as well as PCS bands. For PCS, high gain antenna 525 may be a multi-band (e.g., dual band) antenna.

CICM 130 may further include a processor 530. Although shown as a single CPU, different kinds of processors may be used. Additionally, processor 530 may comprise more than one processor.

In some embodiments, processor 530 may include processing circuitry, logic, and program instructions and/or data to enable all control, routing, and discrimination functions. The program instructions and data may be used to facilitate all decisions and routing based on user, operator, and/or other input. Control and "direction" of call routing (inbound or outbound) over either media may be sensitive to parameters such as called number, calling number, time of day (TOD), day of week (DOW), and other parameters that may be pre-selected by one or more users to determine which device (e.g., a particular telephone or fax device) or media (e.g., wireline or cell) to utilize for the particular purpose.

The program instructions and data may be utilized for call control and utilization of features (such as call waiting, call forwarding, bridging, conferencing, voicemail, and/or other features). In some embodiments, a user may define parameters for call control and/or features. In some embodiments, at least some parameters may be provided by stored program information, and/or programmed over the air or via one or more interfaces.

CICM 130 may further include one or more hardware- and/or software-based switches 510. Call connectivity and routing data may be transmitted to and enacted by switch 510. Calls to and from system 100 may be switched according to predefined routines, which may be implemented by CICM 130. Switch 510 may connect calls to and between any of the devices 150 and/or external sources/destinations. Since the voice is converted into digital data packages, a transmission to an additional WAM(s) can easily be achieved by resending the package to different WAM address(es). As noted above, in some embodiments, CICM 130 may use Time Division Multiple Access (TDMA) techniques and/or Frequency Division Multiple Access (FDMA) to permit communication with multiple WAM 140s.

CICM 130 may further include a WAM controller 515 to provide control information to one or more WAMs (internal to CICM 130 and/or external). For example, WAM controller 515 may generate one or more signals to transmit to one or more WAMs, and may control certain connections under the direction of processor 530, using user-defined and/or other data.

CICM 130 may further include one or more device interface(s) 535 to interface with devices 150 (e.g., POTS devices). For example, interface 535 may perform analog connectivity and core telephony signaling functions for associated devices 150. In some embodiments, there may be up to four or more interfaces 535.

CICM 130 may further include one or more data interfaces 540. Interfaces 540 may include one or more of a USB interface, a 10/100 Base-T interface, a serial interface, or other interface. Interfaces 540 may provide user access to system settings or integration with networkable devices. Providing one or more interfaces 540 may allow users to manually program rate information for wireline phones, may allow user to program rate information for wireless phones (e.g., if no automatic update capability exists for the selected wireless carrier), and may have a wireless data interface to enable wireless access of CICM 130. In some embodiments, a user may not be able to update rate plan information for wireless phones if the selected wireless carrier does implement automatic rate plan updates (e.g., using push technology).

In embodiments incorporating a USB interface, CICM 130 may implement a two-wire connection at USB interface 540 rather than a standard four-wire USB connection. In the standard USB implementation, signaling is provided over one pair of wires (wire 2, D−, and wire 3, D+) of the four-wire connection, and power is provided from the master device to slave devices via the second pair of wires (wire 1, $V_{bus}$, and wire 4, Ground) of the four wire connections. In System 100, CICM 130 may uniquely provide USB signaling (D−, D+) to devices WAM 140 over the two-wire telephony cabling, and power to the WAM 140 devices over the same wire pair. CICM 130 and WAM 140 utilize multi-pass filtering techniques to allow DC power (defined as frequencies well below 100 Hz) and USB 2.0 frequencies (centered around approximately 12 MHz in some embodiments) to pass, while removing voice, xDSL, and other frequency components lying between the frequency bands utilized by system 100. In some embodiments, system 100 may operate at frequencies as low as 6 MHz, the upper boundary of the defined telephony specification Part 68, and as high as 480 MHz (frequency of USB 2.0). Limitations of quality of the house telephony wiring limit the frequency up to which system 100 may operate. Frequencies above 480 MHz are feasible, but not desirable, due to the intrinsic signal attenuation characteristics of telephony grade wiring at such frequencies, and signals below 6 MHz may interfere with current xDSL or other future, standards-based operations.

CICM 130 may include an expansion interface 545 to expand the capabilities of CICM 130. An expansion interface 545 may allow for module extensions as more updates and applications are available. For example, CICM 130 may provide a card-edge expansion port/bus to which users may add expansion modules to provide for enhanced functionality. Expansion slots may carry power over power/grounding pins, so that modules may be powered using the internal/external power supply of CICM 130. Expansion interface 545 may include time division multiplexed (TDM) or other slots reserved for additional voice components. Expansion interface 545 may include a data bus compatible with the Ethernet, for data upgrades.

In some implementations, at least one of the following modules may be added to CICM 130 using expansion interface 545: one or more extra cell modules, one or more extra line modules, one or more on/off modules to control external appliances from any LAN or WAM, one or more analog to digital modules, and one or more WAM modules. In some embodiments, the WAM modules may have on/off ports that are optocoupler activated, a temperature sensor, and/or one or more analog to digital converters. Note that, although these modules are discussed as being added as expansion modules, they could also be integrated with CICM 130 and/or WAM 140.

DTMF (Touch Tone) Signal Processing

In some embodiments of a system 100 such as that shown in FIG. 1, one or both of CICM 130 and WAM 140 may perform DTMF detection. In some embodiments, DTMF detection may be performed using standard hardware and software. However, in some embodiments DTMF detection may be performed using an 8-bit microcontroller instead of a dedicated DTMF detection circuit or a DSP (digital signal processor). The systems and techniques described below may allow for reliable DTMF detection at a lower cost than conventional DTMF techniques. The techniques include using a modified Goertzel algorithm, with emphasis on speed of DTMF tone detection.

In normal audio signal processing, a FFT (Fast Fourier Transform) or a derivative is often used to detect tones. In most designs, this is done by a DSP. Seen from the designers view, it is very easy and safe to add a DSP to a design, buy a 'canned' FFT package and start programming to detect DTMF (Dual Tone Multiple Frequency) signals.

The disadvantage of this easy method is cost: every time a product is sold, one often has to pay royalty fee to the FFT package owner. Additionally, the DSP increases the device cost.

If one is looking for only a few frequencies (as is the case when detecting DTMF) a little known but perhaps more appropriate method is available: the Goertzel algorithm. The Goertzel algorithm only looks for one predefined tone per computation.

The basic Goertzel algorithm gives one both the real and imaginary frequency components. However, in DTMF detection, there is no need for the imaginary part. Instead, we can use an optimized algorithm that only detects the magnitude squared of a given frequency. When the DTMF tone corresponds to one of plurality of candidate frequencies (e.g., the three frequencies that make up the three columns normally found on a POTS), the magnitude squared for that particular frequency will be above a threshold amount.

To compute the magnitude squared of a given tone in a set of samples, only a few simple calculations are needed per sample. For further information, many sources are available; see for example a paper by Kevin Banks available at URL: http://www.embedded.com/showArticle.jhtml?articleID=9900722

The calculations are as follows:
1. As in standard FFT, a number of samples, N is needed. Unlike the FFT, N doesn't need to be a power of two.
2. $k$=integer part of $(0.5+(N*f)/Fs)$; where f is the wanted frequency, and Fs is sample frequency.
3. $\omega=(2*\pi/N)*k$;
4. $\text{cosine}=\cos(\omega)$
5. $\text{sine}=\sin(\omega)$
6. $\text{coeff}=2*\text{cosine}$ We also need three variables: q0, q1, q2, where q1 and q2 are initialized to 0.

For every sample, compute $$q0=\text{coeff}*q1-q2+\text{sample}$$

$$q2=q1$$

$$q1=q0$$

When we have computed the qs N times, it is time to look for the candidate frequency:

$$\text{Real}=q1-q2*\text{cosine}$$

$$\text{Imag}=q2*\text{sine}$$

$$\text{Magnitude}^2=\text{real}^2+\text{imag}^2$$

In order to determine if the candidate frequency corresponds to the DTMF tone, the magnitude is compared to a threshold value to see if the power at that frequency is sufficiently high. If the power exceeds the threshold value, the DTMF tone is identified as the particular candidate frequency.

Another, faster method is to use an optimized form:

$$\text{Magnitude}^2=q1^2+q2^2-q1*q2*\text{coeff}$$

The above processes use a relatively large number of multiplication operations. For 8-bit calculations, a multiply instruction is relatively time-consuming Rather than executing multiply instructions to calculate q0, table lookup may be used. Additionally, by replacing the calculation for magnitude squared with a simple addition of the absolute values of the QsN, a very fast method for DTMF detection is realized, where no multiplication operations are needed. This technique may also be applied to more-than-8-bit-processors, e.g. 16 or 32 bit.

In short, after N samples and calculations, the relative amplitude is calculated as follows:

$$\text{Relative amplitude}=\text{abs}(q0N)+\text{abs}(q1N)+\text{abs}(q2N)$$

After relative amplitude calculations, simple decisions and comparisons may be performed to see if the candidate frequencies have enough power to be identified as the detected frequency, and also to test for twist between the pair of frequencies.

To make it even simpler, we only need to look for three frequencies: the three frequencies that make up the three columns normally found on a POTS. If one frequency is found, then the algorithm may test for one of the four that makes up the rows. Once the row and column are identified, the DTMF tone is detected.

One possible drawback to the above technique is that the pre-calculated values reside in the ROM, taking up code space. However, using larger memory arrays can mitigate this problem.

Command Protocol

During operation, a user may use pound and star commands to execute one or more commands using a system such as system 100 of FIG. 1. However, many external systems use pound and star commands as well. In order to avoid conflicts between internal commands and external commands, a command protocol may be implemented.

For example, when a command sequence is initiated prior to dialing, system 100 may determine that the command sequence is to be implemented on system 100, rather than externally.

After a call has been placed, a command buffer may be used to execute command sequences in system 100 as follows. In response to receiving a pound, star, or other signal indicating initiation of a command for system 100, the buffer stores information indicative of the first received signal. If the next key pressed is part of a command sequence for system 100, the buffer stores information indicative of the second received signal. The process continues until one of two terminating events occurs. First, if a command sequence for system 100 is completed, system 100 executes the command, without transmitting the associated tones outside of system 100. Second, if a command sequence for system 100 is not completed (for example, after three keystrokes if system 100 implements three keystroke commands), system 100 waits until all keys for the external command have been pressed. System 100 may determine that all keys for an external command have been pressed what a pre-set time period (e.g., a second) has elapsed with no key strokes. After determining that all keys for an external command have been pressed, system 100 transmits signals indicative of the external command to the destination, and flushes the command buffer.

Figure 6:
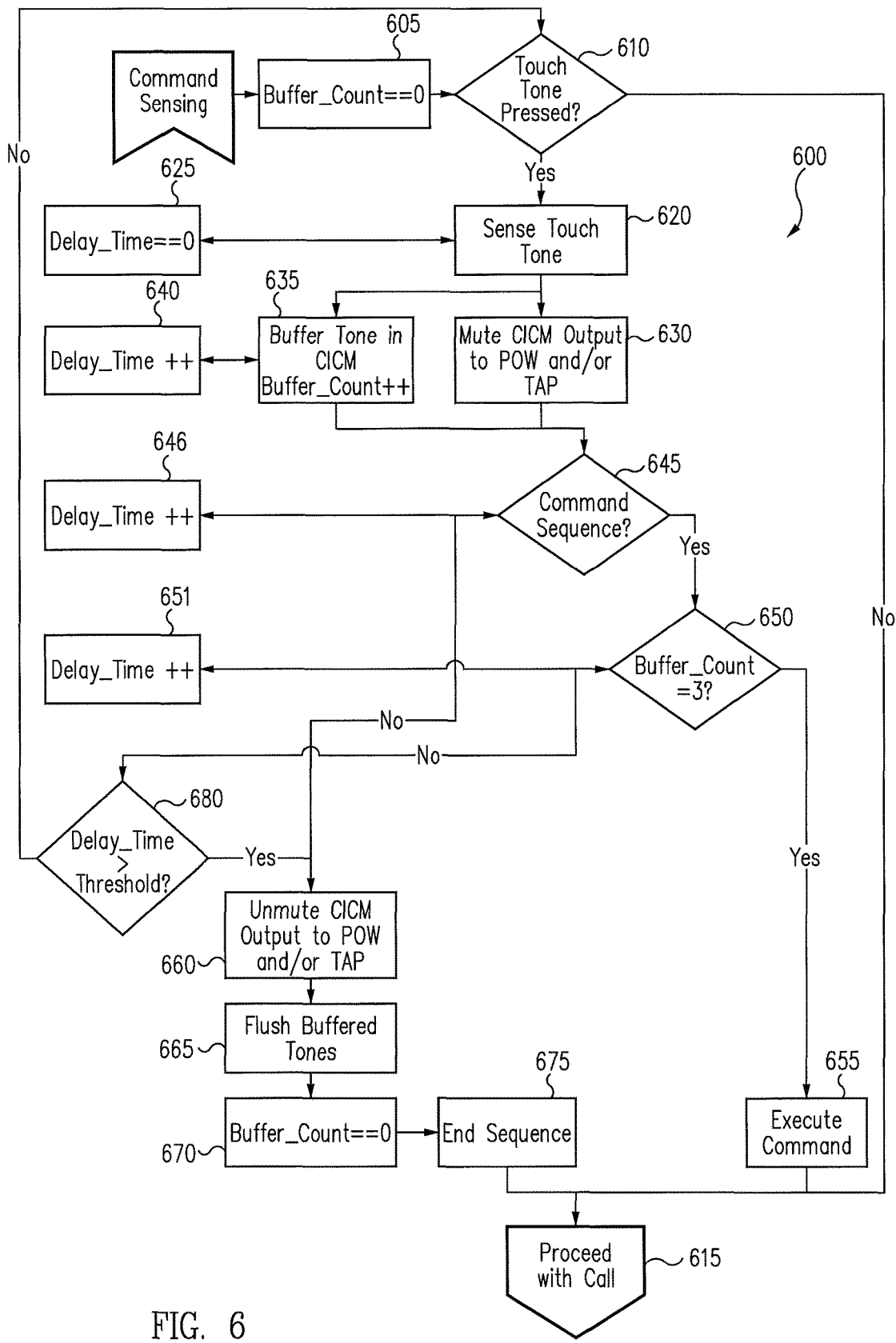
FIG. 6 is a flow diagram of a method of command sensing in a system such as that illustrated in FIG. 1, according to some embodiments.

FIG. 6 illustrates an exemplary process 600 that may be used for command sensing using a system such as system 100 of FIG. 1, in some embodiments. At 605, a command buffer count may be initialized to zero. At 610, system 100 may determine whether a touch tone is pressed. If not, system 100 proceeds with the call at 615.

If a touch tone is pressed, system 100 may sense the touch tone at 620. A delay time may be initialized to zero at 625. At 630, the CICM output to POW and/or TAP may be muted, and at 635 the tone may be buffered. A delay time counter may be incremented/updated at 640.

At 645, system 100 may determine whether the touch tone is part of a command sequence, and may update the delay time counter at 646. If it is not, system 100 may un-mute CICM output to POW and/or TAP at 660, may flush buffered tones at 665, may reset the buffer count at 670, may terminate the sequence at 675, and may proceed with the call at 615.

If the touch tone is determined to be part of a command sequence at 645, system 100 may determine whether the buffer count is equal to three at 650, and may update the delay time counter at 651. If it is, then system 100 executes the command at 655 and proceeds with the call at 615 (without transmitting tones to POW and/or TAP).

If the buffer count is not equal to three, system 100 may determine whether the delay time is greater than a threshold at 680. If not, system 100 may detect another touch tone at 610. If the delay time is greater than the threshold, system 100 may un-mute CICM output to POW and/or TAP at 660, may flush buffered tones at 665, may reset the buffer count at 670, may terminate the sequence at 675, and may proceed with the call at 615.

Exemplary Features and Functions

As noted above, CICM 130 and WAM 140 may implement a number of features and functions. Although many embodiments are possible, the following are some exemplary features and functions that may be provided with a system such as system 100 of FIG. 1.

Automatic Route Selection (ARS) and Least Cost Routing (LCR)

System 100 may implement ARS/LCR call routing. For example, the system controller may determine the best network routing for an outbound call using parameters such as time of day, day of the week, number analysis, wireline and cell phone service plan information, and route analysis.

For example, CICM 130 may be manually and/or automatically configured to select the best path or lowest cost path for outbound calls. In one example, CICM 130 may be configured to use the POW route for all outbound calls except for toll free calls. In another example, all long distance calls may be routed over the TAP. A process for least cost routing (LCR)/automatic route selection (ARS) is described below and illustrated in FIG. 11.

Enhanced 911 Dialing

For an outbound 911 call, system 100 may drop all calls, and may place the outbound 911 call on all lines. This may offer improved effectiveness, since the cell phone module of CICM 130 is a fixed cell module with an address that may be known to the 911 system. Enhanced 911 dialing is described in further detail below.

Conference Calling

In addition to any conference of three-way calling features supported by either wireless service and/or wireline service, CICM may automatically or manually bridge the calls on the POW and TAP. For example, a user may receive a cellular call and a wireline call independently using the same telephone, and then connect them into a single, multi-person call.

Multiple Line Multiplexing to/from WAMs 140

Two or more lines may be multiplexed onto a single twisted pair wireline for communications between one or more WAMs 140 and CICM 130. As a result, a home or small business telephone system can incorporate multiple lines in a cost-effective manner. As noted above, the total number of lines available depends on how many PSTN lines are available (usually one or two) and how many cell lines are used in the system (e.g., a CICM 130 cell module with one cell line, two cell lines, etc.). WAMs 140 and CICM 130 enable multiple contemporaneous calls using the available lines.

Over the Air Programming

CICM 130 and/or WAMs 140 may receive and transmit information either via wired or wireless connections. For example, a wireless carrier service may transmit control information to CICM 130 and/or WAM 140. For example, the wireless carrier service may transmit updated service information to CICM 130, which may then be used in a LCR process to determine a route for a particular outbound call.

Smart Call Routing

Incoming and outgoing calls may be routed using one or more algorithms, based on one or more parameters. Calls may be routed based on the telephone number (e.g., based on the particular identity of the caller, based on the general type of call, such as a business call or personal call, based on the availability of call identification using a mechanism such as caller ID), or other parameter such as the time of day and day of the week.

Some calls may be routed to a sub-set of the available devices. For example, a business telephone call received between 9 and 5 may be routed only to a telephone in an office. A business telephone call received after 5 may be routed directly to business voicemail, while a personal call received after 10 p.m. may be routed to personal voicemail.

Some calls may be routed to all devices, but with different rings depending on the intended recipient. For example, a first call associated with a first user may be routed to all devices in the system, but with a ring associated with the first user. A second call associated with a different user may also be routed to all devices in the system, with a different ring associated with the different user.

Smart call routing may use user profile information and/or WAM profile information. For example, a first user may associate a number of particular telephone numbers with his user profile, so that incoming calls from the particular telephone numbers are routed to the associated WAM, or routed to one or more WAMs using a ring associated with the first user. Similarly, WAM profile information may include particular telephone numbers, so that incoming calls from the particular telephone numbers are routed to the associated WAM (e.g., business calls are routed to a WAM located in a home office).

Exemplary Call Flows

Figure 7:
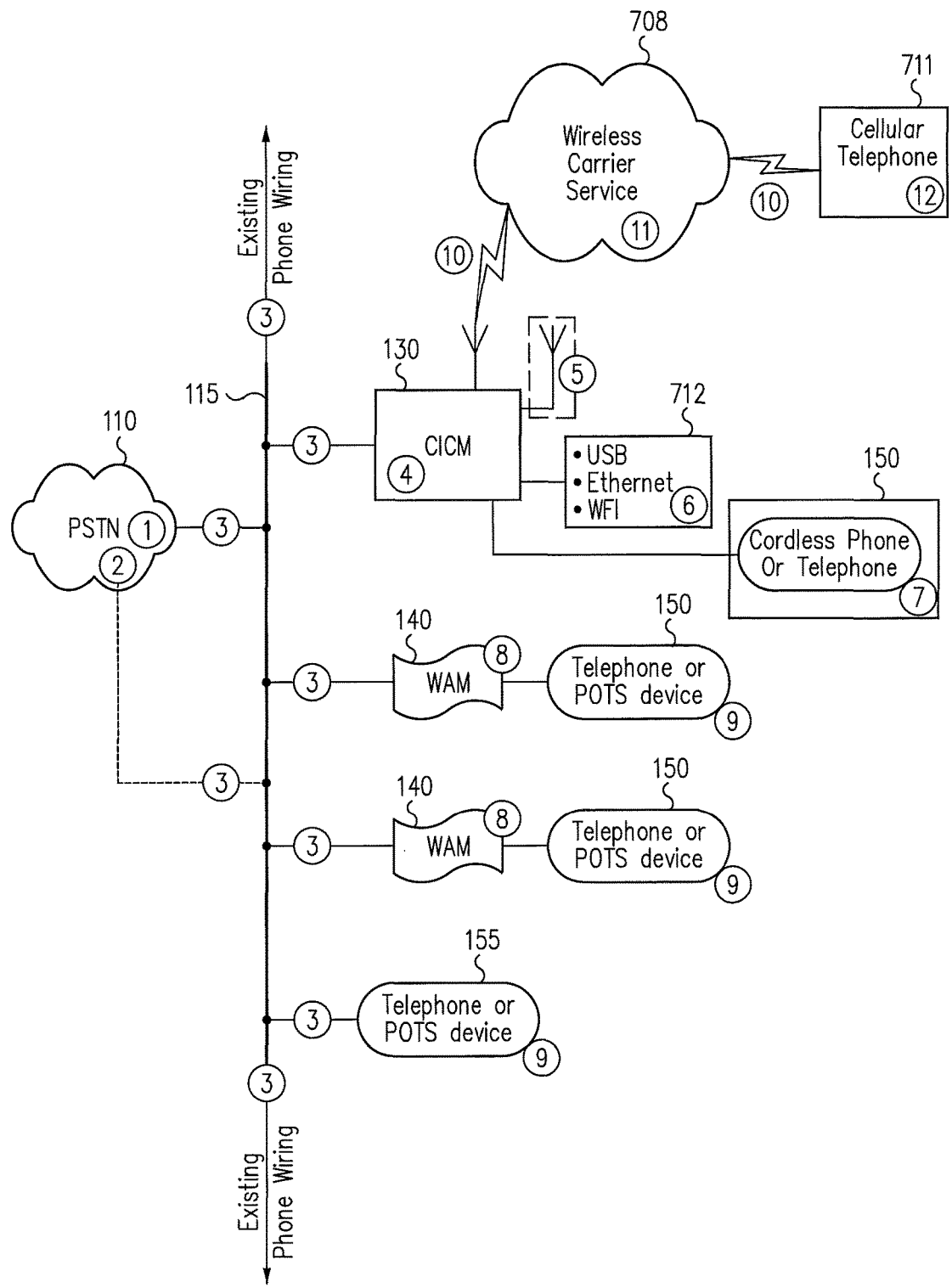
FIG. 7 is a schematic diagram of a telecommunications system, according to some embodiments.

FIG. 7 shows an exemplary configuration of a system 700 incorporating the systems and techniques discussed above. In system 700, PSTN 110 is in communication with CICM 130, WAM 140, devices 150, and devices 155 over telephony wiring 115. CICM 130 is in communication with one or more wireless carrier services 708, as is a cellular telephone 711 over a wireless connection from a cell module of CICM 130. CICM 130 is further in communication with one or more external devices 712 over one or more interfaces such an a USB interface, Ethernet interface, WiFi interface, WiMax interface, or other interface. A number of exemplary call flow scenarios will be described, with reference to FIG. 7.

Scenario 1 (Inbound Call Over PSTN 110)
Case A: Caller Recognized
(1) Signal WAM(s) 140 associated with recognized caller
(2) Ring Mobile Users (Follow Me)
(3) Monitor for First-to-Answer (FTA)
(4) Connect Call with FTA
Case B: Caller Not Recognized
(1) Signal ALL WAM(s) 140
(2) Ring Mobile Users (Follow Me)
(3) Monitor for First-to-Answer (FTA)
(4) Connect Call with FTA
Scenario 2 (Inbound Wireless Call from Cell Phone 711)
Case A: Caller Recognized
(1) Signal WAM(s) 140 associated with recognized caller
(2) Place call over PSTN 110 (Follow me)
(3) Monitor for First-to-Answer (FTA)
(4) Connect call with FTA
Case B: Caller Not Recognized
(1) Signal all WAM(s) 140
(2) Place call over PSTN 110 (Follow Me)
(3) Monitor for First-to-Answer (FTA)
(4) Connect call with FTA
Scenario 3 (Outbound Least Cost Routing (LCR)/Automatic Route Selection (ARS) Call)
(1) Dial number
(2) Determine path (LCR/ARS)
  a. Emergency 911 call (drop all calls, use all lines)
  b. Least cost route (cellular vs. wireline)
  c. Only available line (OAL) with ERWT (expensive route warning tone)

Detailed Flows

The following are some exemplary implementations of call routing for inbound and outbound calls using the PSTN and cell networks, including exemplary command sequences. For the following, L1 and L2 refer to two PSTN lines, while L3A and L3B refer to two cell lines.

(1) Inbound Calls on the PSTN Network

Figure 8:
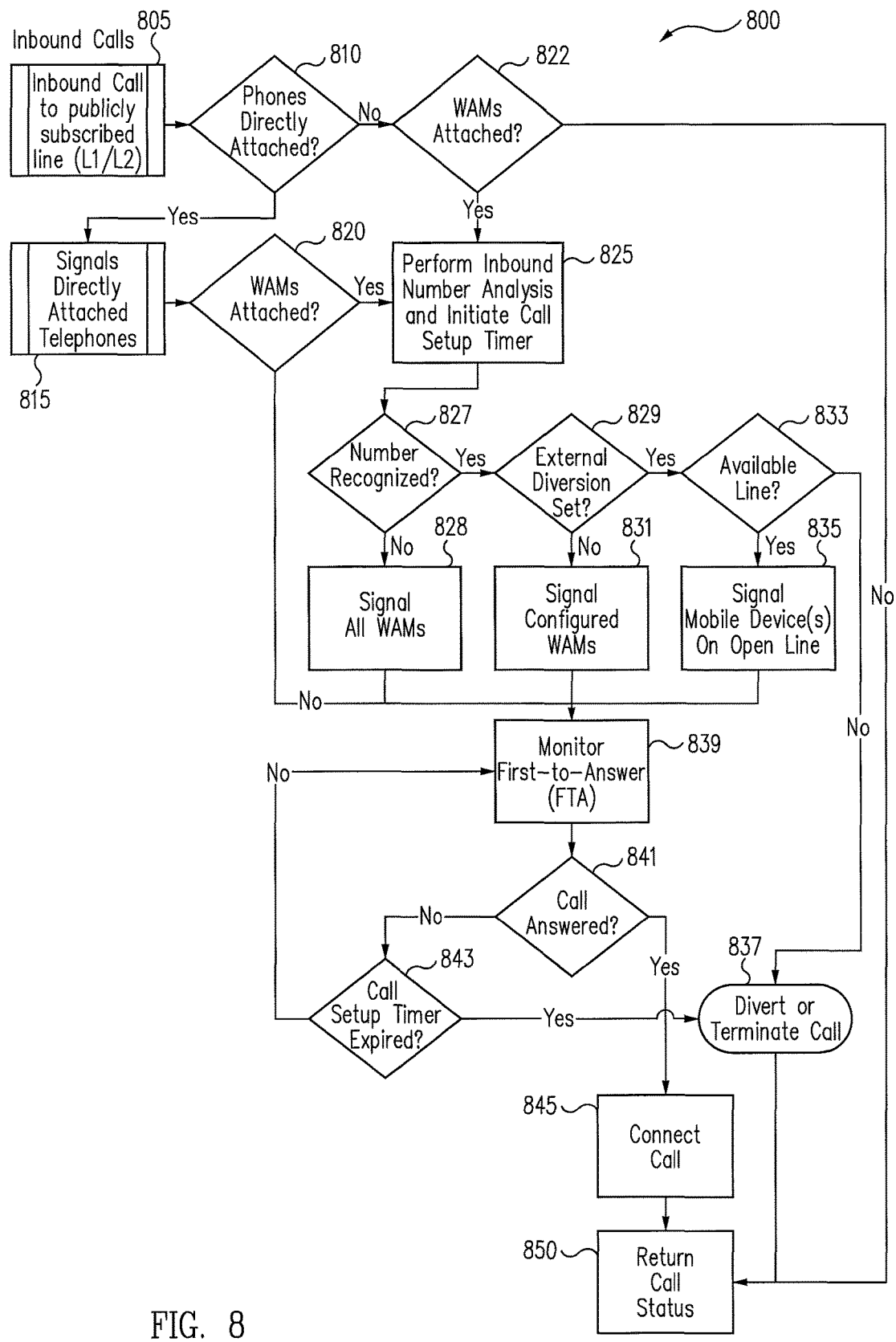
FIG. 8 is a flow chart showing a method for processing calls inbound on a wireline network.

Referring to FIGS. 7 and 8, FIG. 8 shows a method 800 for processing an inbound call to one of the lines associated with PSTN 110. At 805, an inbound call is received on a publicly subscribed line. At 810, if there are any devices 155 directly connected to telephony wiring 115, they may be signaled directly at 815. At 820, if there are any devices 150 with attached WAMs 140, the system may perform inbound number analysis and initiate call setup timer at 825. The call setup timer may monitor signaling to determine whether a pre-selected time has elapsed, indicating that the call should be terminated or diverted (e.g., sent to voicemail, to an answering machine, to a forwarding number, etc.)

Similarly, if there are no devices 155 directly connected to telephony wiring 115, the system may determine if there are any devices 150 with attached WAMs 140 at 822. If there are, the system may perform inbound number analysis and initiate call setup timer at 825.

At 827, the system determines if the number is recognized. If not, all WAMs 140 may be signaled at 828. If so, the system may determine if external diversion is set at 829. If it is not, the system may signal configured WAMs 140 at 831.

If external diversion is set, the system may determine if there is an available line at 833. If there is, the system may signal mobile device(s) on open line at 835. If not, the system may divert or terminate the call at 837, and return a call status at 850.

If one or more WAMs 140 are being signaled, the system may monitor signaled WAMs 140 to determine the first to answer (FTA) at 839. At 841, the system may determine whether the call has been answered. If it has not, the system may determine whether a call setup timer has expired at 843. If it has not, signaling continues, and the system continues to monitor for the FTA at 839. If the call setup timer has expired, the system may divert or terminate the call at 837, and return a call status at 850. If the call is answered, the system may connect the call at 845, and return the call status at 850.

The following gives examples of how method 800 may be implemented in some embodiments:

For all inbound calls on PSTN 110, CICM 130 may perform inbound number analysis to determine if the call is from a recognized number, may assess which WAMs 140 to involve with the inbound call, and may open applicable frequency slots for the pertinent WAMs 140 to be signaled. The call setup timer may also be initiated for all inbound calls.

For the case where a single inbound call is received, and there are two active PSTN lines L1 and L2, the system may implement the following:
  i. Call rings WAMs configured to ring L1
  ii. WAMs configured to ring L2 only or L3 only will not ring
  iii. If the call is answered on a WAM, that WAM is awarded the call. All non-WAM phones can join the call just by picking up a L1 phone. WAM phones can join the call by lifting a WAM handset, waiting for a dial tone (the dial tone may be generated just after the handset is lifted), and pressing a command sequence such as ##1.

For the case where a call is inbound to any line, with no answer by any signaled WAM device, the system may implement the following:
  i. Call times out or rolls to the voice mailbox or answering machine corresponding to the called line.
  ii. A particular WAM can be configured for an answering machine such that the WAM with the answering machine connected will ring for all WAM calls. This feature allows all lines to share a common answering machine.

For the case where a second incoming call is received on L2 while there is an active call on L1, the system may implement the following:

i. WAMs configured for L1 only will not be signaled, nor will parties on these WAMs be affected ii. WAMs configured for L2 only will ring.

iii. Idle WAMs configured for L1 and L2 will ring. WAMs configured for L1 and L2 that have an active call will play a second line call beep (differentiated from call waiting beep), and the user can jump to the other call by pressing a command sequence such as ##2 (L1 is placed on hold when user jumps to L2). Alternately, the user can toggle/jump to the next sequential line by pressing a command sequence such as #J (L1 to L2, L2 to L3, L3 to L1). The user can terminate the active line by pressing a command sequence such as ###, then jump to another active line using command sequences such as #J or ##1, ##2, or ##3.

For the case where there is an inbound call on L2, with L1 idle, the system may implement the following:

i. Call rings WAMs configured to ring L2 ii. WAMs configured to ring L1 only or L3 only will not ring iii. If the call is answered on a WAM, that WAM is awarded the call. All non-WAM phones can join call by selecting line 2, if the non-WAM phone is enabled for multi-line operation. WAM phones can join the call by lifting a WAM handset, waiting for a dial tone, and pressing a command sequence such as ##2.

For the case where there is an active call on L2, and a party calls L1, the system may implement the following:

i. WAMs configured for L2 only will not be signaled, nor will parties on these WAMs be affected ii. WAMs configured for L1 only will ring iii. WAMs configured for L1 and L2 will ring if idle iv. WAMs configured for L1 and L2 that have an active call on L2 will play a second line call beep (differentiated from call waiting beep), and the user can jump to the other call by pressing a command sequence such as ##1 (L1 is placed on hold when jumping to another line). Alternately, the user can toggle/jump to the next sequential line by pressing a command such as #J (L1 to L2, L2 to L3, L3 to L1). Users can terminate the active line by pressing a command such as ###, and jump to another line, if so desired, by pressing commands such as #J to sequentially jump or by pressing "##1", "##2", or "##3" to jump to the corresponding line.

For the case where there is an active call on L1, and a second call ringing L2, the system may implement the following:

i. WAMs configured for L1 only will not be signaled, nor will parties on these WAMs be affected ii. WAMs configured for L2 only will ring iii. WAMs configured for L1 and L2 will ring if idle iv. WAMs configured for L1 and L2 that have an active call on L1 will play a second line call beep (differentiated from call waiting beep), and user can jump to the other call by pressing a command sequence such as ##2 (L1 still held up). Alternately, user can toggle/jump to the next sequential line by pressing a command sequence such as #J (L1 to L2, L2 to L3, L3 to L1). All calls will be placed on hold when jumping to another line. Users can terminate the active line by pressing a command sequence such as ###, and jump to another line, if so desired, by pressing a command sequence such as #J to sequentially jump or by pressing "##1", "##2", or "##3" to jump to the corresponding line.

For the case where calls are incoming to L1 and L2 at the same time, the system may implement the following:

i. WAMs configured for L1 only will ring with call from "A" and WAMs configured for L2 only will ring with call from "B"

ii. WAMs configured for L1 and L2 will ring with distinctive ring

1. User who picks up the call will answer L1 (default) or L2 if System Admin has defined L2 to be default line in this call scenario 2. Users can jump to another line, if so desired, by pressing command sequences such as #J to sequentially jump or by pressing "##1", "##2", or "##3" to jump to the corresponding line.

(2) Inbound Calls on the Cell Network

Figure 9:
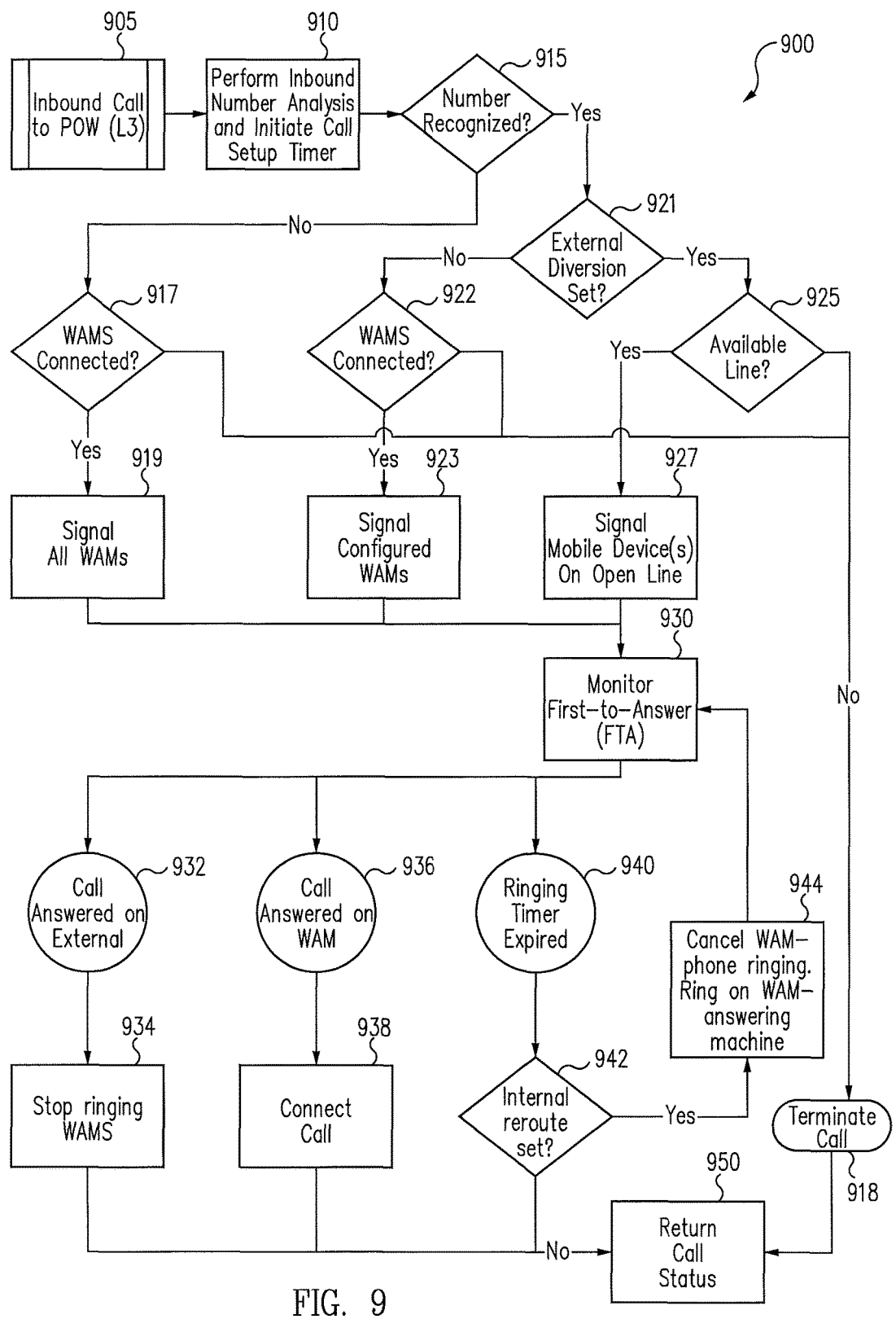
FIG. 9 is a flow chart showing a method for processing calls inbound in a cell network.

FIG. 9 shows a method 900 that may be used to route inbound calls on the cell network (which may be referred to as the POW connection). At 905, an inbound call may be received on the POW connection. At 910, the system may perform inbound number analysis and initiate a call setup timer.

At 915, the system determines if the number is recognized. If not, the system determines if one or more WAMs are connected at 917. If not, the call is terminated at 918, and a call status is returned at 950. If at least one WAM is connected, the system signals all WAMs at 919.

If the number is recognized, the system determines if external diversion is set at 921. If not, the system determines if one or more WAMs are connected at 922 and signals configured WAMs at 923.

If external diversion is set, the system determines if there is an available line at 925. If not, the call is terminated at 918 and the call status is returned at 950. If there is an available line, the system signals mobile device(s) on at least one open line at 927.

At 930, the system is monitored for the first to answer. If the call is answered externally at 932, the system stops ringing the WAMs at 934 and returns a call status at 950. If the call is answered on a WAM at 936, the system connects the call at 938 and returns the call status at 950. If the ringing timer has expired (e.g., the time exceeds the pre-selected call setup timer amount) at 940, then the system determines whether an internal re-routing has been set at 942. If it has, then WAM telephone ringing is cancelled and the new routing is implemented at 944 (e.g., a WAM-connected answering machine is rung).

The following gives examples of how method 900 may be implemented in some embodiments:

For the case where L3A receives a call with CICM 130 free of other connections, WAMs 140 configured to ring on L3 calls will ring.

For the case where L3A receives a call while calls are connected on L1 and L2, the system may implement the following:

i. WAMS configured to receive L3 calls only will ring ii. L1 and L2 configured WAM phones that also are configured to ring L3 will ring if not in use (phone is on-hook)

iii. L1 and L2 configured WAM phones that also are configured to ring L3 will play a L3 inbound call tone if WAM is in use (phone is off-hook).

For the case where L3B receives a call with a call on L3A (with L1 and L3 idle):

i. A L3 enabled and active WAM alerts the user with a call waiting alert tone/beep ii. Called party uses hook flash to toggle to the L3B line.

iii. Called party can terminate either line by hanging up or pressing a command sequence such as ### iv. If called party hangs up on one active party, the wireless provider will again ring the POW with the remaining call.

(3) Outbound Calls

Figure 10:
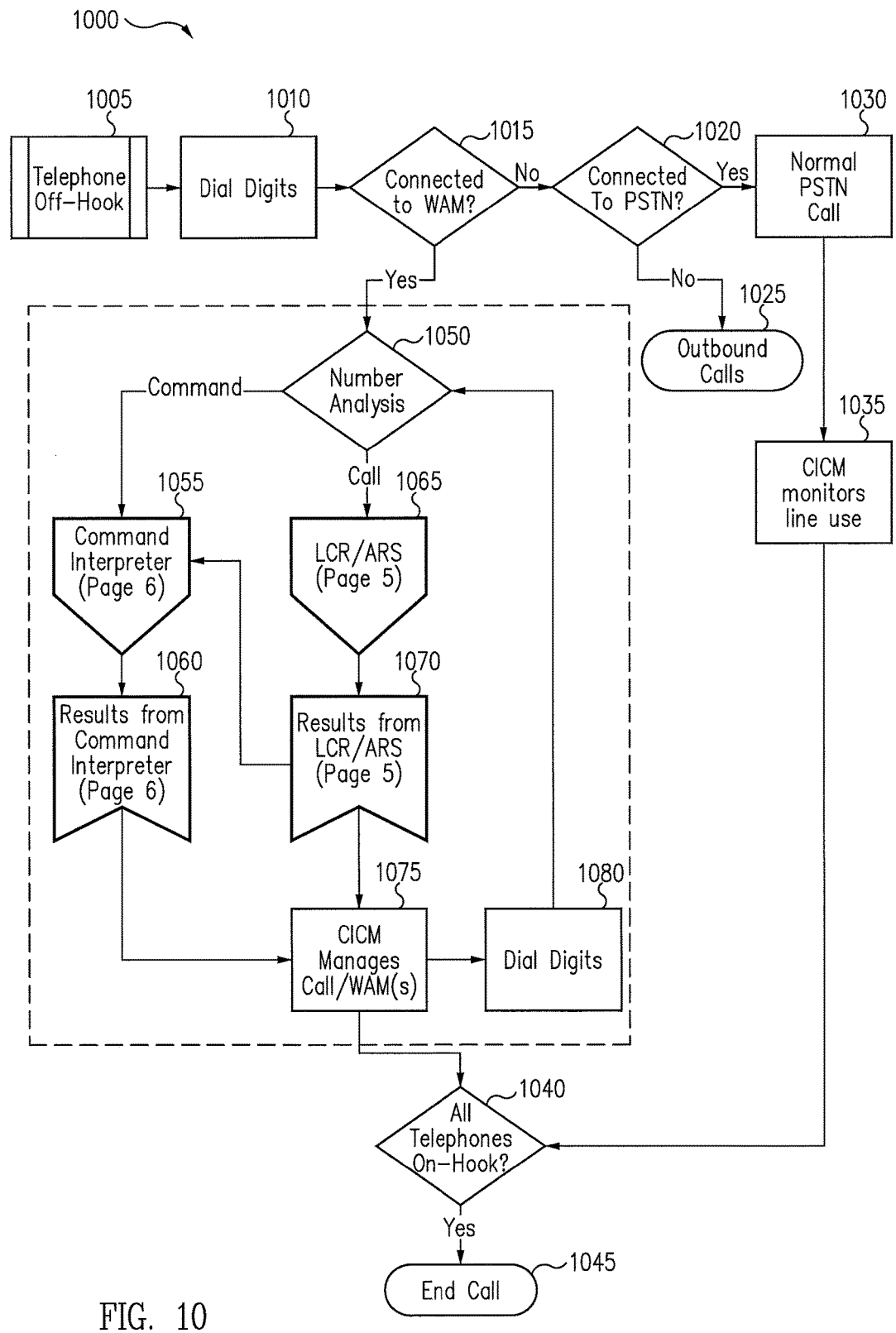
FIG. 10 is a flow chart showing a method for processing outbound calls to wireline and cell networks.

FIG. 10 shows a process 1000 that may be used to process outbound calls.

At 1005, a user may lift a telephone handset to initiate the outbound call process. At 1010, the user may dial the digits for the desired telephone number. At 1015, the system determines if the telephone is connected to a WAM 140. If not, the system determines if the telephone is connected to PSTN 110 at 1020. If not, the system does not place an outbound call at 1025. If the telephone is connected to PSTN 110, the system places a normal PSTN call at 1030. CICM 130 monitors the line at 1035, determines whether all telephones are on-hook at 1040, and when they are all on-hook terminates the call at 1045.

If the telephone is connected to a WAM 140, the system performs number analysis at 1050. If the number corresponds to a command, a command interpreter may be invoked at 1055. The results may be obtained at 1060. If the number corresponds to an outbound call, least cost routing (LCR) or automatic route selection (ARS) may be performed at 1065 to determine whether to place the call on a PSTN line or a cell line. At 1070, results from LCR or ARS analysis may be obtained, and at 1075, CICM 130 may manage the outbound call. At 1080, more digits may be dialed, which may then be analyzed at 1050. During a call, the system may monitor the lines to determine whether all telephones are on hook at 1040. If so, the system may end the call at 1045.

The following gives examples of how method 1000 may be implemented in some embodiments:

For calls over PSTN 110 (lines L1 and L2), when a user picks up a handset, WAM 140 detects an off-hook state. WAM 140 signals CICM 130 that an off-hook state has been detected, and requests a dial tone. If no battery/line voltage is detected on L1 or L2 and no signal is present on L3, CICM 130 may generate (in the Subscriber Line Interface Circuits or SLICs) a congestion tone, which may be delivered to WAM 140 using its designated frequency/time slot. The user may initiate commands to page other WAMs or to disconnect the call.

If not, CICM 130 delivers a dial tone to WAM 140 over its designated frequency/time slot. WAM 140 sends dialed digits to CICM 130 over its frequency/time slot without additional analysis. CICM 130 buffers the dialed numbers and performs number analysis on them before connecting/looping the call to an outbound line.

For the case where the outbound call is to be placed on PSTN 110 and the particular WAM 140 is limited to L1, the system may implement the following:

a. CICM 130 performs call analysis and determines that WAM 140 is limited to dialing outbound on L1 b. If L1 is idle, call goes out on L1 as expected, and user hears "L1 selected" feedback tone/beeps c. If L1 is busy, calling party hears fast busy tone (generated by CICM SLIC's)

d. L2 remains idle

For the case where the outbound call is to be placed on PSTN 110 and the particular WAM 140 is limited to L2, the following may occur:

a. CICM 130 performs call analysis and determines that WAM 140 is limited to dialing outbound on L2 b. If L2 is idle, call goes out on L2 as expected, and user hears "L2 selected" feedback tone/beeps c. If L2 is busy, calling party hears fast busy tone (generated by CICM SLIC's)

d. L1 remains idle

For the case where the outbound call is to be placed on PSTN 110 and WAM 140 may use either L1 or L2, the following may occur:

a. CICM 130 performs call analysis and determines that WAM 140 can dial outbound on L1 or L2 b. If L2 is idle and L2 has best rate plan for dialed number, call goes out on L2 as expected, and user hears "L2 selected" feedback tone/beeps c. If L2 has best rate plan and is busy, call goes out L1 and calling party hears "L1 selected" feedback tone/beeps (generated by CICM SLIC's)

d. If L1 is idle and L1 has best rate plan for dialed number, call goes out L1 as expected, and user hears "L1 selected" feedback tone/beeps e. If L1 has best rate plan and is busy, call goes out L2 and calling party hears "L2 selected" feedback tone/beeps (generated by CICM SLIC's)

For the case where a call is to be placed on PSTN 110 and L1 is busy, the following may be used:

1. If WAM 140 is configured for L1 only, the user hears a busy tone. The user may join the call by pressing a command sequence such as #J 2. If WAM 140 is configured for L2 only, the system will place the call on L2 as expected. L1 remains undisturbed by new call 3. If WAM 140 is configured for L1 and L2, the system will place the call on L2. L1 remains undisturbed by new call. Caller can jump to L1 call by pressing a command sequence such as #J.

For the case where one call is placed on L1 and a different call is placed on L2, the call on L1 may be placed first. If the call is answered, the system completes the call as described above. If not, the un-answered call is treated according to rules for the particular call. WAMs 140 associated with L1 are then "busy." Another user may join the call on L1 by picking up a device connected to a WAM 140, hearing the congestion tone, and pressing a command sequence such as #1. A "join call" tone/beep will alert the existing parties that a new party has joined the call.

For the case where there are concurrent calls on PSTN 110 and cell module 220 (and/or other special handling based on either status conditions or programmed data), WAM 140 may call a number included in the number analysis table. A call hold signal may be generated by WAM 140. A call conference may be signaled by WAM 140 (indicating a call in progress on another line).

Some special types of calls may be processed using different call flows than the general flows described above. Some examples are given below.

For the case where a WAM 140 calls 911, the system may implement the following:

If L1 and L2 are idle (or L2 not present):

i. If WAM 140 is configured to use either line, the call goes out on L1 or L2 (selected randomly) unless L1 is set to "Always First". Default setting is "Random" if two lines are present.

ii. If WAM 140 is configured to use L1 only, call goes out on L1 iii. If WAM 140 is configured to use L2 only, call goes out L2

If L1 is busy and L2 is idle:

i. If WAM 140 is configured to use either line, then call goes out on L2 ii. If WAM 140 is configured to use L1 only, L1 is seized, existing call is terminated, and call to 911 placed by WAM on L1 iii. If WAM 140 is configured to use L2 only, call goes out L2

If L1 is busy and L2 is not present, L1 is seized, the existing call is terminated, and the call to 911 is placed by WAM 140 over L1.

If L1 and L2 are activated and busy:

i. If WAM 140 is configured to use either line, then L1 or L2 are seized (selected randomly), existing call is terminated/disconnected, and the 911 call goes out on the seized line. This is the default setting.

ii. If L1 is set to "Always First," L1 is seized, existing call is terminated/disconnected, and the 911 call goes out on the seized line. The default setting is "Random" if two lines are present.

iii. If L2 is set to "Always First," L2 is seized, the existing call is terminated/disconnected, and the 911 call goes out seized line.

For the case where a WAM 140 calls particular special purpose number (such as 411, 511, 611, or other service provider defined special number), the system may process the outbound call in the same manner as a regular outbound call, with the outbound line selected according to the configuration of the particular WAM 140. Each WAM 140 can be assigned a different default line, with the default condition of these calls going to L1, L2 or L3 can be programmed as defaults at an individual WAM level, or at a system default level.

In implementations where CICM 130 utilizes a digit buffer, these special numbers may be programmed into CICM 130 by default to speed up call completion. Additionally, the system administrator can add or modify special/specific numbers to the number analysis table. Alternately, if the user pauses for five seconds (or the regionally recognized time) between dialed digits, CICM 130 will send the dialed digits out the default line.

If the particular WAM 140 is configured for more than one line, the user may dial the ##"L" prefix, where "L" represents the number of the line (1, 2, 3) first in order to select a specific line for that provider's service center.

For the case where a WAM 140 calls a toll free (e.g., 1-8xx) number, the system may implement the following:

If L1 and L2 are idle (or L2 is not present):

i. If WAM 140 is configured to use either line, then call goes out L1 or L2 (selected randomly) unless L1 is set to "Always First". Default setting is "Random" if two lines are present ii. If WAM 140 is configured to use L1 only, call goes out on L1 iii. If WAM 140 is configured to use L2 only, call goes out on L2

If L1 is busy and L2 is idle:

i. If WAM 140 is configured to use either line, then call goes out on L2 ii. If WAM 140 is configured to use L1 only, call is blocked, and caller hears "fast busy' tone generated locally at the WAM 140. Caller can then join the existing call iii. If WAM 140 is configured to use L2 only, call goes out on L2

If L2 is busy and L1 is idle:

i. If WAM 140 is configured to use either line, then call goes out L1 ii. If WAM 140 is configured to use L2 only, call is blocked, and caller hears "fast busy' tone generated locally at the WAM 140. Caller can then join the existing call iii. If WAM 140 is configured to use L1 only, call goes out L1

If L1 is busy and L2 is not present, WAM 140 is automatically configured to use L1 only. The call is blocked, and caller hears "fast busy' tone generated locally at the WAM 140. Caller can then join the existing call.

If L1 and L2 are both present and busy, the call is blocked and the caller hears a special fast busy tone (two lines busy). Caller can join either existing call.

For the case where a WAM 140 calls a number included in the number analysis table other than those listed above, CICM 130 may bridge WAM 140 to the appropriate line as determined by number analysis. The call routing may default to normal call flow patterns if the intended line is already active/busy.

Over course, the above call flows are exemplary only; many different call flows may be used. Further, if CICM 130 is not functional or not powered (or if some other system problem arises) WAMs 140 may implement a bypass mode. In bypass mode, calls may be processed as though CICM 130 and WAM 140 are not present.

System 100 may also support internal private calls between WAM-connected devices 150. WAM-connected devices 150 then act as a private, point-to-point intercom system without interfering with inbound/outbound calls over any subscribed line (L1, L2, L3, etc.). For example, in the case of an internal (WAM to WAM) call, a user may lift the handset of device 150 and dial #P+(the number of the other WAM). CICM 130 then signals the called WAM, which rings the "internal call" pattern. If the called WAM is busy, the caller hears a fast busy tone. If an inbound call is received on L1, L2 or L3, configured WAMs in the party will hear a call waiting and can hook flash over to the waiting call.

Figure 11:
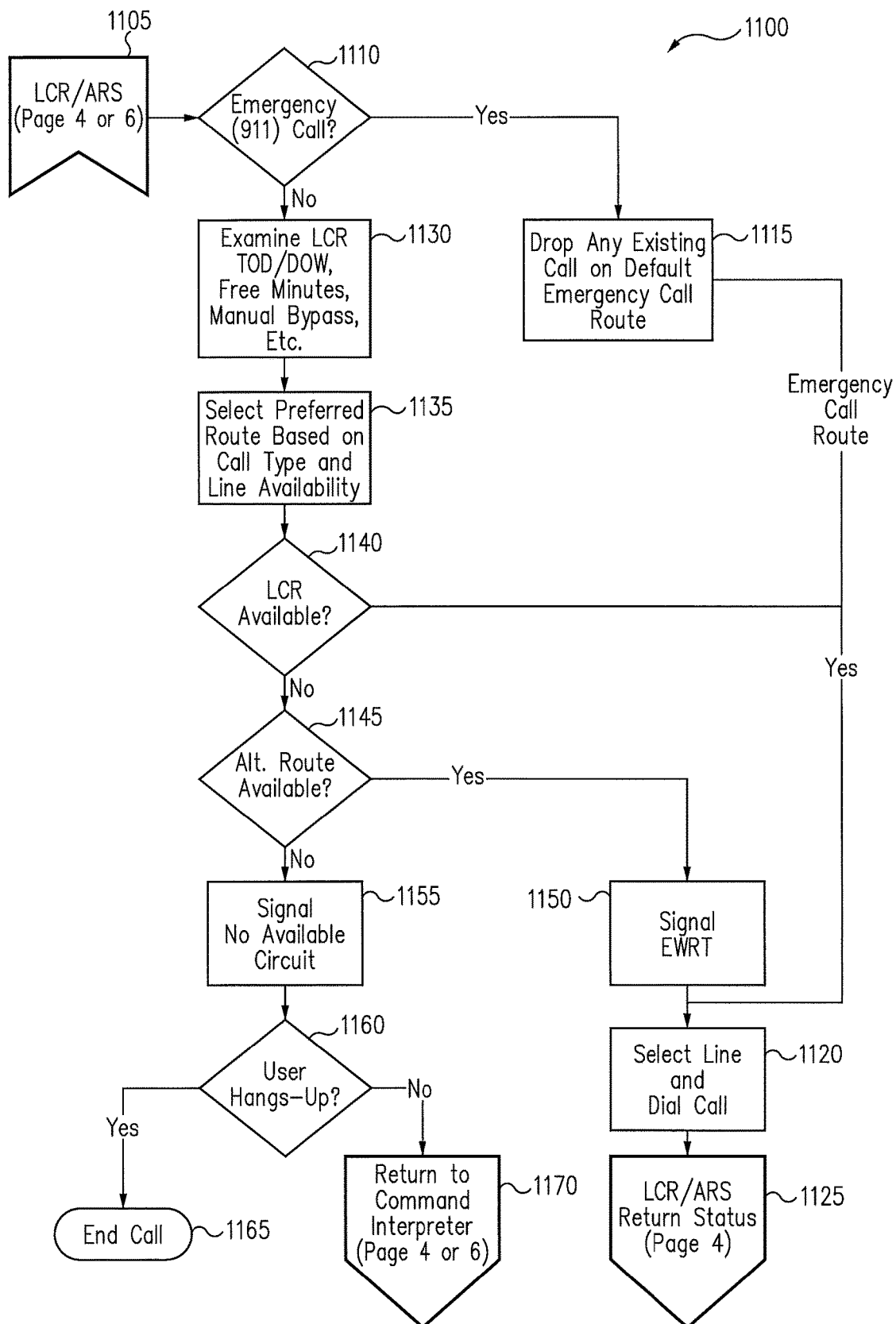
FIG. 11 is a flow chart showing a method of least cost routing/automatic route selection.

As noted above, CICM 130 and/or WAMs 140 may implement Least Cost Routing (LCR) and/or Automatic Route Selection (ARS), which may be collectively referred to as LCR/ARS. FIG. 11 shows an embodiment of a process 1100 that may be used for LCR/ARS. At 1105, a LCR/ARS process is generated when a number is dialed. The system determines if the number is indicative of an emergency (e.g., 911) at 1110. If it is, the system may drop any existing call on default emergency call route(s) at 1115. The system may then select one or more lines and dial the call at 1120, and return a LCR/ARS status at 1125.

If the number is not indicative of an emergency, the system may determine parameters such as the time of day/day of week, number of free minutes available, manual bypass status, and/or other parameters at 1130. The system may select a preferred route based on one or more parameters, call type, and/or line availability at 1135.

At 1140, the system determines if the least cost route is available. If it is, the system selects the line and dials the call at 1120, and returns a LCR/ARS status at 1125. If the least cost route is not available, the system determines whether an alternate route is available at 1145. If there is an alternate route, the system may signal an EWRT at 1150, select the line and dial the call at 1120, and return a LCR/ARS status at 1125.

If no alternate route is available, the system may generate a signal indicating that no route is available at 1155. The system them determines whether the user hangs up at 1160. If so, the system terminates the call at 1165. If the user does not hang up, the system may invoke a command interpreter such as that illustrated in FIG. 6 to process one or more touch tone inputs at 1170.

A system such as system 100 of FIG. 1 may have additional benefits. For example, CICM 130 and WAM 140 may be relatively small, so that they may be taken from one location to another. For example, a business traveler may take CICM 130 with him on a business trip, and be able to plug CICM 130 into the local telephone system and use one or both of the cellular capability and the wireline capability of CICM 130. Cellular telephone service is available in many locations worldwide, enabling use of the cellular capability in many regions outside the United States. Additionally, since many countries provide a wireline telephone system similar to the PSTN, CICM 130 may be used outside of the United States (although some wireline system-specific programming may be necessary).

In another example, CICM 130 and WAM 140 may be shipped to a customer pre-programmed. In such an embodiment, a user may plug CICM 130 into a telephone jack and a power outlet, plug one or more WAMs 140 into a telephone jack and a device, and be ready to place and receive calls immediately. Such an implementation may provide a significant benefit to less technology-savvy consumers, for whom product installation is a significant burden.

In implementations, the above described techniques and their variations may be implemented at least partially as computer software instructions. Such instructions may be stored on one or more machine-readable storage media or devices and are executed by, e.g., one or more computer processors, or cause the machine, to perform the described functions and operations.

A number of implementations have been described. Although only a few implementations have been disclosed in detail above, other modifications are possible, and this disclosure is intended to cover all such modifications, and most particularly, any modification which might be predictable to a person having ordinary skill in the art. For example, some functionality described above as being performed in CICM 130 may be performed by one or more WAMs 140. Additionally, the modules described herein need not be implemented as discrete circuit/software elements. For example, system controller module 230 of CICM 130 may be implemented as a single module, or its functionality may be provided by multiple modules.

Also, only those claims which use the words "means for" are intended to be interpreted under 35 USC 112, sixth paragraph. Moreover, no limitations from the specification are intended to be read into any claims, unless those limitations are expressly included in the claims. Accordingly, other embodiments are within the scope of the following claims.

What is claimed is:

1. A method of providing communication between a wireless cellular telephony network and two-wire telephony wiring, the method comprising:
    receiving, by an antenna at a user location, a wireless cellular telephony signal from the wireless cellular telephony network;
    identifying, by a control module at the user location and in communication with the antenna, a wireline adapter device also at the user location, wherein the wireline adapter device is electrically coupled to the control module by the two-wire telephony wiring; and
    selectively routing, by the control module to the wireline adapter device over the two-wire telephony wiring, digital data packets corresponding to the telephony signal to provide the telephony signal to a user telecommunications device coupled to the wireline adapter device.

2. The method of claim 1, wherein:
    the identifying comprises identifying a plurality of the wireline adapter devices at the user location; and
    the routing comprises routing the digital data packets to at least a subset of the wireline adapter devices over the two-wire telephony wiring.

3. The method of claim 2, wherein the routing is performed based on a predetermined association between the subset of the wireline adapter devices and the telephony signal.

4. The method of claim 3, further comprising:
    analyzing, by the control module, the telephony signal to determine a telephone number associated with the telephony signal; and
    wherein the association between the subset of the wireline adapter devices and the telephony signal is the telephone number.

5. The method of claim 1, wherein the telephony signal is a digital telephony signal.

6. The method of claim 1, wherein:
    the telephony signal is an analog telephony signal; and
    the method further comprises converting the analog telephony signal to the digital data packets.

7. The method of claim 1, further comprising:
    connecting the control module to a public switched telephone network (PSTN) by the two-wire telephony wiring;
    connecting the control module to a mobile telephony operator by the antenna; and
    communicating, by the control module, with an external device over a WiFi interface.

8. The method of claim 1, further comprising:
    initiating a call setup timer in response to the receiving the telephony signal; and
    wherein the routing comprises routing the digital data packets to the wireline adapter device after the call setup timer has expired.

9. The method of claim 1, wherein the selectively routing comprises transmitting the digital data packets to the wireline adapter device over the two-wire telephony wiring using frequency division multiplexing and/or time division multiplexing.

10. The method of claim 1, wherein:
    the location is a building associated with the user; and
    the two-wire telephony wiring is enclosed within the building.

11. A system configured to provide communication between a wireless cellular telephony network and two-wire telephony wiring, the system comprising:
    an antenna, at a user location, configured to receive a wireless cellular telephony signal from the wireless cellular telephony network;
    a control module, at the user location and in communication with the antenna, comprising:
        a memory configured to store a plurality of machine readable instructions; and
        a processor configured to execute the plurality of machine readable instructions to perform a method comprising:
            identifying a wireline adapter device at the user location, wherein the wireline adapter device is electrically coupled to the control module also at the user location by the two-wire telephony wiring, and
            selectively routing digital data packets corresponding to the telephony signal received at the user location to the wireline adapter device over the two-wire telephony wiring to provide the telephony signal to a user telecommunications device coupled to the wireline adapter device.

12. The system of claim 11, wherein:
the identifying comprises identifying a plurality of the wireline adapter devices at the user location; and
the routing comprises routing the digital data packets to at least a subset of the wireline adapter devices over the two-wire telephony wiring.

13. The system of claim 12, wherein the routing is performed based on a predetermined association between the subset of the wireline adapter devices and the telephony signal.

14. The system of claim 13, wherein the method further comprises:
analyzing, by the control module, the telephony signal to determine a telephone number associated with the telephony signal; and
wherein the association between the subset of the wireline adapter devices and the telephony signal is the telephone number.

15. The system of claim 11, wherein the telephony signal is a digital telephony signal.

16. The system of claim 11, wherein:
the telephony signal is an analog telephony signal; and
the control module is further adapted to convert the analog telephony signal to the digital data packets.

17. The system of claim 11, wherein the control module is connected to a public switched telephone network (PSTN) by the two-wire telephony wiring, the control module is connected to a mobile telephony operator by the antenna, and the control module is configured to communicate with an external device over a WiFi interface.

18. The system of claim 11, wherein the method further comprises:
initiating a call setup timer in response to the receiving the telephony signal; and
wherein the routing comprises routing the digital data packets to the wireline adapter device after the call setup timer has expired.

19. The system of claim 11, wherein the selectively routing comprises transmitting the digital data packets to the wireline adapter device over the two-wire telephony wiring using frequency division multiplexing and/or time division multiplexing.

20. The system of claim 11, further comprising the wireline adapter device.

* * * * *